US010914823B2

(12) United States Patent
Nash et al.

(10) Patent No.: US 10,914,823 B2
(45) Date of Patent: Feb. 9, 2021

(54) TIME OF FLIGHT RANGING WITH VARYING FIELDS OF EMISSION

(71) Applicant: QUALCOMM Incorporated, San Diego, CA (US)

(72) Inventors: James Wilson Nash, San Diego, CA (US); Kalin Mitkov Atanassov, San Diego, CA (US); Stephen Michael Verrall, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 15/968,317

(22) Filed: May 1, 2018

(65) Prior Publication Data

US 2019/0339364 A1 Nov. 7, 2019

(51) Int. Cl.
*G01S 7/48* (2006.01)
*G01S 7/484* (2006.01)
*G01S 7/4865* (2020.01)
*G01S 17/08* (2006.01)
*G01S 17/89* (2020.01)

(52) U.S. Cl.
CPC ............ *G01S 7/484* (2013.01); *G01S 7/4865* (2013.01); *G01S 17/08* (2013.01); *G01S 17/89* (2013.01)

(58) Field of Classification Search
CPC ..... H04N 13/239; G01S 17/89; G01S 7/4815; G01S 7/4816
See application file for complete search history.

(56) References Cited

U.S. PATENT DOCUMENTS

| | | | |
|---|---|---|---|
| 2015/0229912 A1 | 8/2015 | Masalkar et al. | |
| 2017/0212220 A1* | 7/2017 | Dahlmann | ........... H04N 13/239 |
| 2018/0048880 A1 | 2/2018 | Trail et al. | |
| 2019/0033429 A1* | 1/2019 | Donovan | .............. G01S 7/4815 |
| 2019/0109977 A1 | 4/2019 | Dutton et al. | |
| 2019/0154439 A1* | 5/2019 | Binder | .................... G01S 15/08 |

OTHER PUBLICATIONS

International Search Report and Written Opinion—PCT/US2019/028537—ISA/EPO—dated Jul. 29, 2019.

* cited by examiner

*Primary Examiner* — Luke D Ratcliffe

(74) *Attorney, Agent, or Firm* — Qualcomm Incorporated

(57) ABSTRACT

Aspects of the present disclosure relate to systems and methods for time-of-flight ranging. An example time-of-flight system includes a transmitter including a plurality of light emitters for transmitting focused light, the plurality of light emitters including a first group of light emitters for transmitting focused light with a first field of transmission and a second group of light emitters for transmitting focused light with a second field of transmission. The first field of transmission at a depth from the transmitter is larger than the second field of transmission at the depth from the transmitter. The time-of-flight system also includes a receiver to receive reflections of the transmitted light.

30 Claims, 17 Drawing Sheets

FIG. 7
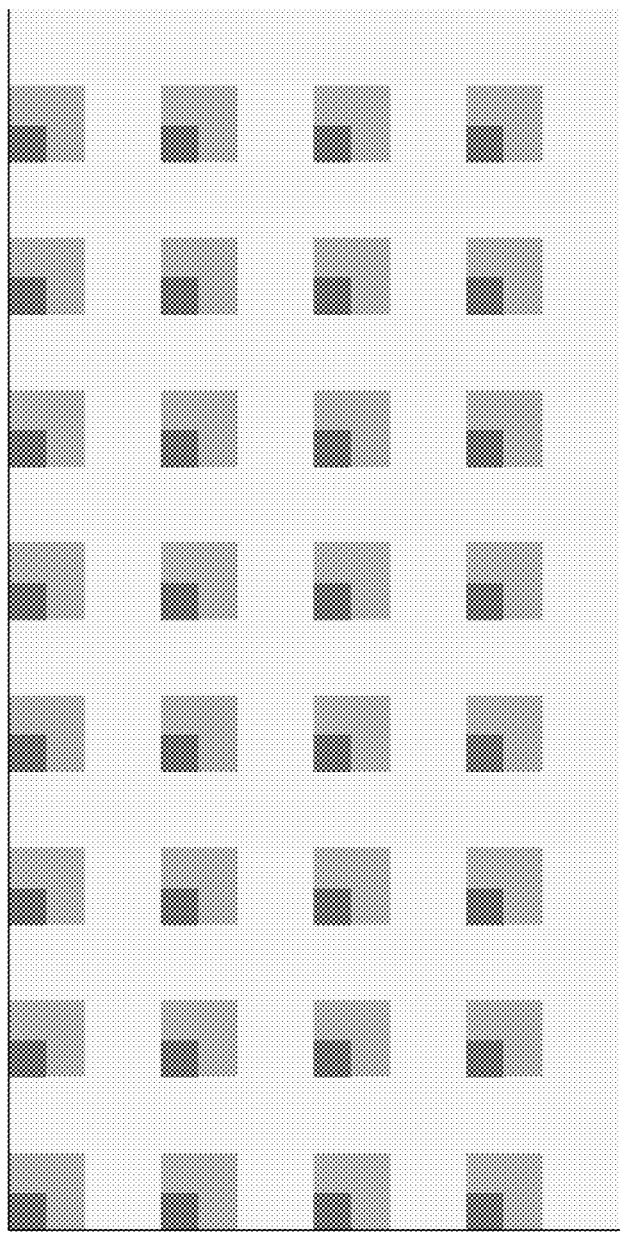
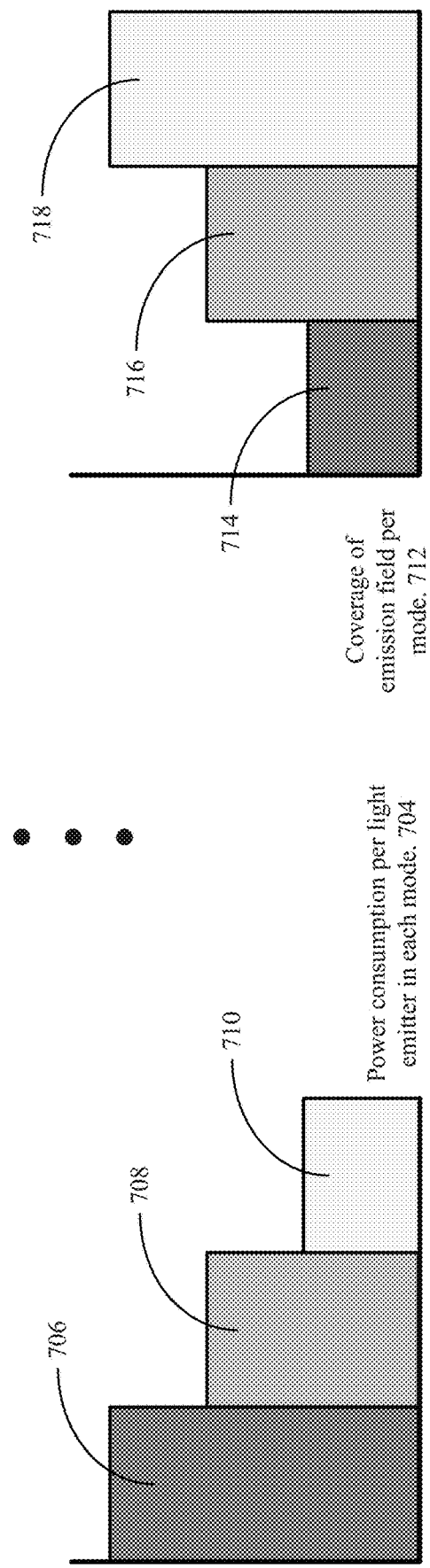

TIME OF FLIGHT RANGING WITH VARYING FIELDS OF EMISSION

TECHNICAL FIELD

This disclosure relates generally to systems and methods for time-of-flight ranging, and specifically to varying the fields of emission for time-of-flight ranging.

BACKGROUND

A device may determine distances of its surroundings using different depth finding systems. In determining the depth, the device may generate a depth map illustrating or otherwise indicating the depths of objects from the device by emitting one or more wireless signals and measuring reflections of the wireless signals from the scene. Two types of depth finding systems are a time-of-flight (TOF) system and a structured light system.

For a TOF system, a light is emitted, and a reflection of the light is received. The round trip time of the light from the transmitter to the receiver is determined, and the distance or depth from the TOF system of the object reflecting the emitted light is determined from the round trip time. For a structured light system, a known spatial distribution of light is transmitted, and the reflections of the spatial distribution are received. For structured light systems, the transmitter and receiver are separated by a distance, and displacement and distortion of the spatial distribution occurs at a receiver as a result. Triangulation with the displacement and distortion of the spatial distribution and the distance between the transmitter and receiver is used in determining a distance or depth from the structured light system of the object reflecting the emitted light.

A problem with conventional structured light systems is that the distance between the transmitter and receiver (causing or increasing displacement and distortion of the spatial distribution) may cause shadows on or occlusions of the received spatial distribution. As a result, portions of the spatial distribution may be missing or not be correctly identified so that depths of portions of the scene cannot be determined.

Conventional TOF systems have the transmitter and receiver collocated, and therefore do not have a distance between a transmitter and a receiver as in structured light systems. As a result, shadows and occlusions from an aperture do not interfere with measurements. However, a conventional TOF system emits and relies on a fixed field of emission that is larger than the field of emissions from structured light systems at a common depth from a transmitter. As a result, noise and interference from ambient light (such as sunlight or other external light sources) may cause a conventional TOF system to be unable to identify the reflections from the receiver measurements, and a conventional TOF system may have a shorter effective range than conventional structured light systems.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for TOF ranging. An example TOF system includes a transmitter including a plurality of light emitters for transmitting focused light, the plurality of light emitters including a first group of light emitters for transmitting focused light with a first field of transmission and a second group of light emitters for transmitting focused light with a second field of transmission. The first field of transmission at a depth from the transmitter is larger than the second field of transmission at the depth from the transmitter. The TOF system also includes a receiver to receive reflections of the transmitted light.

In another example, a method for performing TOF ranging is disclosed. The method includes transmitting, by a transmitter including a plurality of light emitters, focused light. A first group of light emitters of the plurality of light emitters are to transmit focused light with a first field of transmission and a second group of light emitters of the plurality of light emitters are to transmit focused light with a second field of transmission. The first field of transmission at a depth from the transmitter is larger than the second field of transmission at the depth from the transmitter. The method further includes receiving reflections of the transmitted light.

In a further example, a non-transitory computer-readable medium storing one or more programs containing instructions is disclosed. Executing the instructions by one or more processors of a device cause the device to perform operations including transmitting, by a transmitter including a plurality of light emitters, focused light. A first group of light emitters of the plurality of light emitters are to transmit focused light with a first field of transmission and a second group of light emitters of the plurality of light emitters are to transmit focused light with a second field of transmission. The first field of transmission at a depth from the transmitter is larger than the second field of transmission at the depth from the transmitter. Executing the instructions causes the device to perform operations further including receiving reflections of the transmitted light.

In another example, a device for performing TOF ranging is disclosed. The device includes means for transmitting focused light with a first field of transmission, means for transmitting focused light with a second field of transmission, wherein the first field of transmission at a depth is larger the second field of transmission, and means for receiving reflections of the transmitted light.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 7 is a depiction of the coverage of the emission fields for an array of emitters.

DETAILED DESCRIPTION

Figure 1:
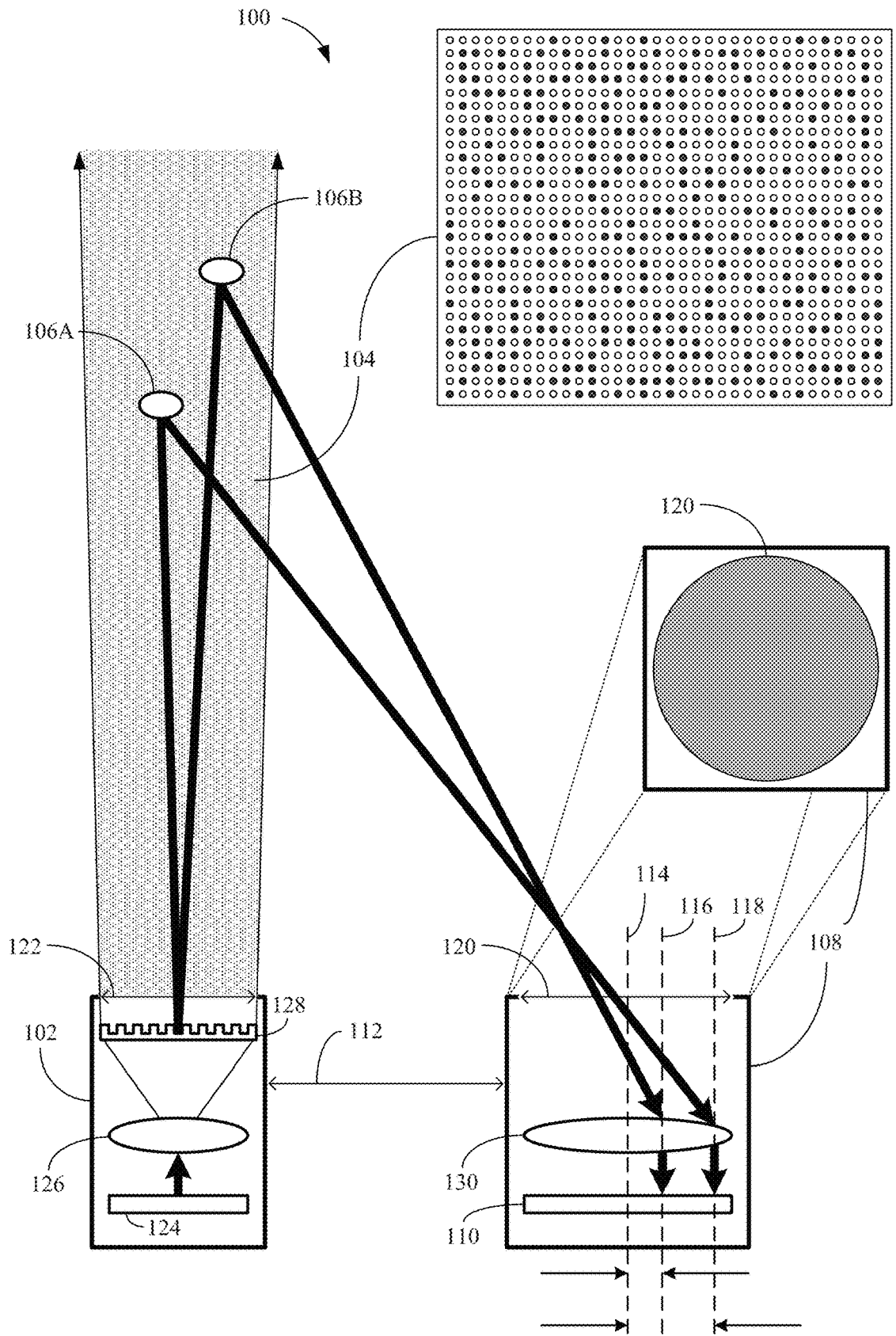
FIG. 1 is a depiction of an example structured light system.

Aspects of the present disclosure may be used for TOF systems. In some example implementations, a TOF transmitter may transmit focused light with different fields. For example, a transmitter may include a plurality of light emitters for transmitting focused light, the plurality of light emitters including a first group of light emitters for transmitting focused light with a first field of transmission and a second group of light emitters for transmitting focused light with a second field of transmission. The first field of transmission at a depth from the transmitter is larger than the second field of transmission at the depth from the transmitter.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits, systems, and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example systems and devices may include components other than those shown, including well-known components such as a processor, memory and the like.

Aspects of the present disclosure are applicable to any TOF ranging, and may be included in or coupled to any suitable electronic device or system (such as security systems, smartphones, tablets, laptop computers, digital cameras, vehicles, drones, virtual reality devices, or other devices that may utilize depth sensing). While described below with respect to a device having or coupled to one TOF system, aspects of the present disclosure are applicable to devices having any number of TOF systems.

The term "device" is not limited to one or a specific number of physical objects (such as one smartphone, one controller, one processing system and so on). As used herein, a device may be any electronic device with one or more parts that may implement at least some portion of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, have one or more housings, be one or more objects integrated into another device, and may have movable or static components. While the below description and examples use the term "system" to describe various aspects of this disclosure, the term "system" is not limited to a specific configuration, type, or number of objects.

Two types of ranging systems include structured light systems and TOF systems. FIG. 1 is a depiction of an example structured light system 100. The structured light system 100 may be used to generate a depth map (not pictured) of a scene (with objects 106A and 106B at different depths in the scene), or may be used for other applications for ranging of objects 106A and 106B or other portions of the scene. The structured light system 100 may include a transmitter 102 and a receiver 108.

The transmitter 102 may be configured to project a spatial distribution 104 onto the scene (including objects 106A and 106B). In some example implementations, the transmitter 102 may include one or more light sources 124 (such as laser sources), a lens 126, and a light modulator 128. In some embodiments, the light modulator 128 includes one or more diffractive optical elements (DOEs) to diffract the emissions from one or more light sources 124 (which may be directed by the lens 126 to the light modulator 128) into additional emissions. The light modulator 128 may also adjust the intensity of the emissions. Additionally or alternatively, the lights sources 124 may be configured to adjust the intensity of the emissions.

In some other implementations of the transmitter 102, a DOE may be coupled directly to a light source (without lens 126) and be configured to diffuse the emitted light from the light source into at least a portion of the spatial distribution 104. The spatial distribution 104 may be a fixed distribution of emitted light that the transmitter projects onto a scene. For example, a DOE may be manufactured so that the black spots in the spatial distribution 104 correspond to locations in the DOE that prevent light from the light source 124 being emitted by the transmitter 102. In this manner, the spatial distribution 104 may be known in analyzing any reflections received by the receiver 108. The transmitter 102 may transmit the light in a spatial distribution through the aperture 122 of the transmitter 102 and onto the scene (including objects 106A and 106B).

The receiver 108 may include an aperture 120 through which reflections of the emitted light may pass, be directed by a lens 130 and hit a sensor 110. The sensor 110 may be configured to detect (or "sense"), from the scene, one or more reflections of the spatial distribution of light. As illustrated, the transmitter 102 may be positioned on the same reference plane as the receiver 108, and the transmitter 102 and the receiver 108 may be separated by a distance 112 called the "baseline."

The sensor 110 may include an array of photodiodes (such as avalanche photodiodes) to measure or sense the reflections. The array may be coupled to a complementary metal-oxide semiconductor (CMOS) sensor including a number of pixels or regions corresponding to the number of photodiodes in the array. The plurality of electrical impulses generated by the array may trigger the corresponding pixels or regions of the CMOS sensor to provide measurements of the reflections sensed by the array. Alternatively, the sensor 110 may be a photosensitive CMOS sensor to sense or measure reflections including the reflected codeword distribution. The CMOS sensor logically may be divided into groups of pixels that correspond to a size of a bit or a size of a codeword (a patch of bits) of the spatial distribution 104.

The reflections may include multiple reflections of the spatial distribution of light from different objects or portions of the scene at different depths (such as objects 106A and 106B). Based on the baseline 112, displacement and distortion of the sensed light in spatial distribution 104, and intensities of the reflections, the structured light system 100 may be used to determine one or more depths and locations of objects (such as objects 106A and 106B) from the structured light system 100. With triangulation based on the baseline and the distances, the structured light system 100 may be used to determine the differing distances between objects 106A and 106B. For example, if the portion of the spatial distribution 104 of the reflections from objects 106A and 106B received at sensor 110 are recognized or identified as the same, the distance between the location 116 where the light reflected from object 106B hits sensor 110 and the center 114 of sensor 110 is less than the distance between the location 118 where the light reflected from object 106A hits sensor 110 and the center 114 of sensor 110. A smaller distance may indicate that the object 106B is further from the transmitter 102 than object 106A. The calculations may further include determining displacement or distortion of the spatial distribution 104 to determine depths or distances.

In conventional structured light systems, the points of the spatial distribution 104 are uniformly dispersed. In this manner, the space between neighboring points in a first portion of the spatial distribution 104 is the same size as the space between neighboring points in a second portion of the spatial distribution 104. However, there may be more difficulty in using the edges of the spatial distribution 104 as compared to the center of a spatial distribution 104 when determining depths.

The transmitter 102 and the receiver 108 may be manufactured or oriented so that the apertures 122 and 120 are along the same plane. As a result, the center of the spatial distribution 104 from the transmitter 102 may not be reflected onto the center of the sensor 110 when reflecting the light off of a flat object parallel to the baseline 112. Further, objects typically are not perfectly flat or parallel to the baseline, which may cause the angle of the reflection approaching the receiver 108 to be more severe than if the objects are flat and parallel to the baseline. As a result, the aperture 120 of the receiver 108 may block portions of the reflected spatial distribution of light. The interference may be most pronounced at the edges of the spatial distribution, as the edge of the emitted light may approach the receiver 108 outside the aperture. In one example, interference may be more pronounced for reflections from object 106A than for reflections from object 106B since the angle of arrival to the aperture 120 for the reflections from object 106B is less than for the reflections from object 106A. The effective aperture (the appearance of the aperture based on the angle of arrival) may be smaller for reflections from object 106A than for reflections from object 106B. For example, if the perspective or origin of the reflections is off-center from a field of view of the receiver 108, the aperture 120 may appear smaller from the perspective than from a perspective that is centered in the field of view of the receiver 108.

Figure 2:
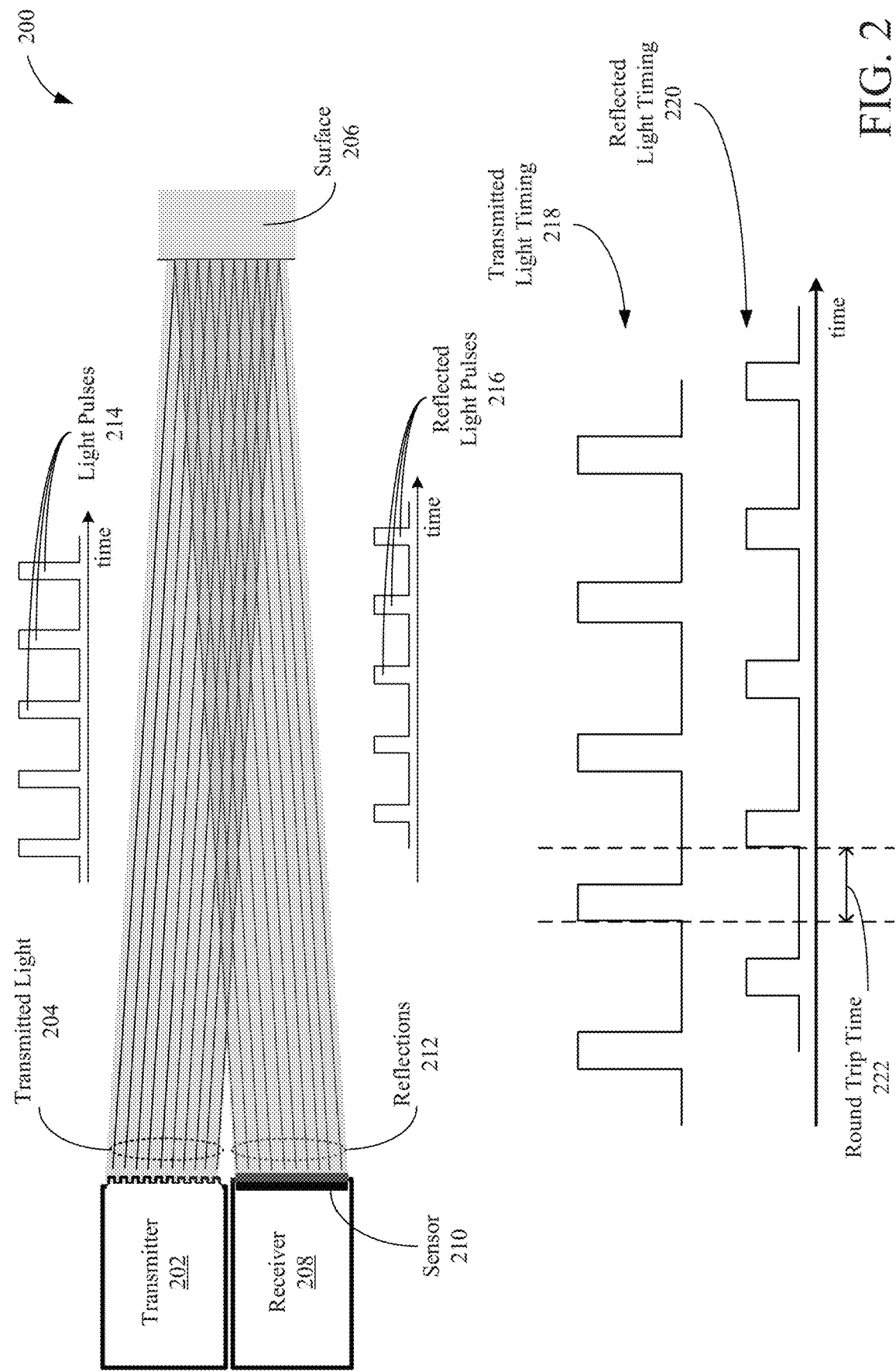
FIG. 2 is a depiction of an example TOF system.

One alternative to a structured light system is a TOF system. FIG. 2 is a depiction of an example TOF system 200. The TOF system 200 may be used to generate a depth map (not pictured) of a scene (with surface 206 in the scene), or may be used for other applications for ranging surface 206 or other portions of the scene. The TOF system 200 may include a transmitter 202 and a receiver 208. The transmitter 202 may be referred to as a "transmitter," "projector," "emitter," and so on, and should not be limited to a specific transmission component. Similarly, the receiver 208 may be referred to as a "detector," "sensor," "sensing element," "photodetector," and so on, and should not be limited to a specific receiving component.

The transmitter 202 may be configured to transmit, emit, or project signals (such as a field of light) onto the scene (including surface 206). While TOF systems are described in the examples as emitting light (which may include near-infrared (NIR)), signals at other frequencies may be used, such as microwaves, radio frequency signals, sound, and so on. The present disclosure should not be limited to a specific range of frequencies for the emitted signals.

The transmitter 202 transmits light 204 toward a scene. While the transmitted light 204 is illustrated as being directed to surface 206, the field of the emission or transmission by the transmitter extends beyond as depicted for the transmitted light 204. For example, conventional TOF system transmitters have a fixed focal length lens for the emission that defines the field of the transmission from the transmitter. The fixed field of the transmission for a conventional TOF system is larger at a depth from the transmitter than the fixed field of transmissions for each point of the spatial distribution for a conventional structured light system. As a result, conventional structured light systems may have longer effective ranges than conventional TOF systems.

The transmitted light 204 includes light pulses 214 at known time intervals (such as periodically). The receiver 208 includes a sensor 210 to sense the reflections 212 of the transmitted light 204. The reflections 212 include the reflected light pulses 216, and the TOF system determines a round trip time 222 for the light by comparing the timing 218 of the transmitted light pulses to the timing 220 of the reflected light pulses. The distance of the surface 206 from the TOF system may be calculated to be half the round trip time multiplied by the speed of the emissions (such as the speed of light for light emissions).

The sensor 210 may include an array of photodiodes to measure or sense the reflections. Alternatively, the sensor 210 may include a CMOS sensor or other suitable photosensitive sensor including a number of pixels or regions for sensing. The TOF system 200 identifies the reflected light pulses 216 as sensed by the sensor 210 when the magnitudes of the pulses are greater than a threshold. For example, the TOF system measures a magnitude of the ambient light and other interference without the signal, and then determines if further measurements are greater than the previous measurement by a threshold. However, the noise or the degradation of the signal before sensing may cause the signal-to-noise ratio (SNR) to be too great for the sensor to accurately sense the reflected light pulses 216.

To reduce interference, the receiver 208 may include a bandpass filter before the sensor 210 to filter some of the incoming light at different wavelengths than the transmitted light 204. There is still noise sensed by the sensor, though, and the SNR increases as the signal strength of the reflections 212 decreases (such as the surface 206 moving further from the TOF system 200, or the reflectivity of the surface 206 decreasing). The TOF system 200 may also increase the power for the transmitter 202 to increase the intensity of the transmitted light 204. However, many devices have power constraints (such as smartphones, tablets, or other battery devices), and are limited in increasing the intensity of the emitted light in a fixed field for a TOF system.

In some aspects of the present disclosure, the TOF system is configured to adjust the field of transmission or emission. In decreasing the field of transmission/focusing the light transmissions, the TOF system may extend the effective distance for ranging. In some example implementations, the TOF system may be configured to transmit light with different fields of transmissions, where a first field of transmission at a depth from the transmitter is larger than a second field of transmission at the depth from the transmitter.

Figure 3:
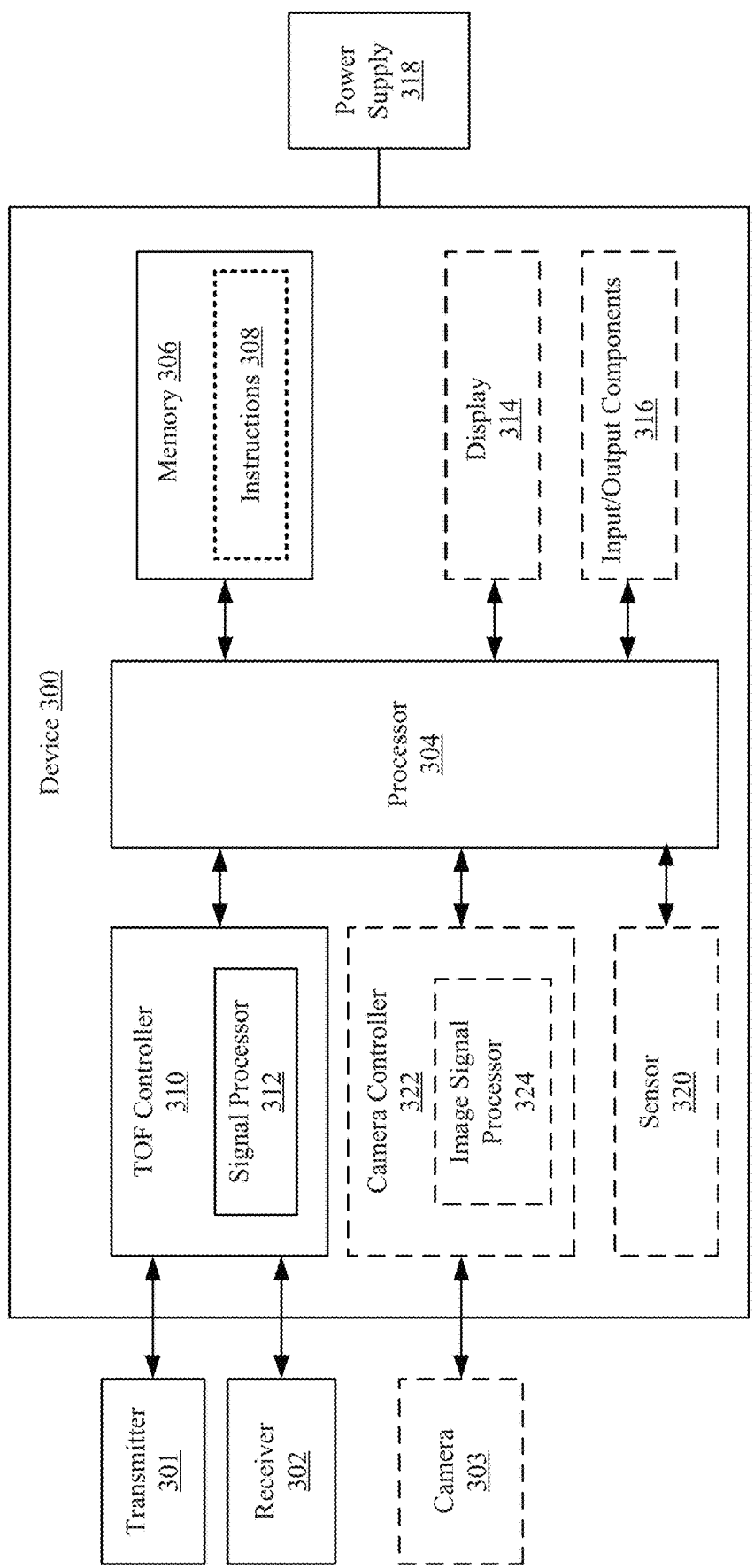
FIG. 3 is a block diagram of an example device including a TOF system.

FIG. 3 is a block diagram of an example device 300 including a TOF system. In some other examples, the TOF system may be coupled to the device 300. The example device 300 may include or be coupled to a transmitter 301 (such as transmitter 202 in FIG. 2), a receiver 302 (such as receiver 208 in FIG. 2), a processor 304, a memory 306 storing instructions 308, a TOF controller 310 (which may include one or more signal processors 312). The device 300 may optionally include (or be coupled to) a display 314 and a number of input/output (I/O) components 316. The device 300 may also optionally include a camera 303 (which may be a single camera, dual camera module, or a module with any number of camera sensors) coupled to a camera controller 322 (which may include one or more image signal processors 324 for processing captures from the camera 303). The device 300 may further optionally include one or more sensors 320 (such as a gyroscope, magnetometer, inertial sensor, NIR sensor, and so on). The device 300 may include additional features or components not shown. For example, a wireless interface, which may include a number of transceivers and a baseband processor, may be included for a wireless communication device. The device 300 may also include a power supply 318, which may be coupled to or integrated into the device 300.

The transmitter 301 and the receiver 302 may be part of a TOF system (such as TOF system 200 in FIG. 2) controlled by the TOF controller 310 and/or the processor 304. The device 300 may include or be coupled to additional TOF systems, one or more structured light systems, or a different configuration for the TOF system. The disclosure should not be limited to any specific examples or illustrations, including the example device 300.

The memory 306 may be a non-transient or non-transitory computer readable medium storing computer-executable instructions 308 to perform all or a portion of one or more operations described in this disclosure. The processor 304 may be one or more suitable processors capable of executing scripts or instructions of one or more software programs (such as instructions 308) stored within the memory 306. In some aspects, the processor 304 may be one or more general purpose processors that execute instructions 308 to cause the device 300 to perform any number of functions or operations. In additional or alternative aspects, the processor 304 may include integrated circuits or other hardware to perform functions or operations without the use of software. While shown to be coupled to each other via the processor 304 in the example of FIG. 3, the processor 304, the memory 306, the TOF controller 310, the optional display 314, the optional I/O components 316, the optional camera controller 322, and the optional sensor 320 may be coupled to one another in various arrangements. For example, the processor 304, the memory 306, the TOF controller 310, the optional display 314, the optional I/O components 316, the optional camera controller 322, and/or the optional sensor 320 may be coupled to each other via one or more local buses (not shown for simplicity).

The display 314 may be any suitable display or screen allowing for user interaction and/or to present items (such as a depth map or a preview image of the scene) for viewing by a user. In some aspects, the display 314 may be a touch-sensitive display. The I/O components 316 may be or include any suitable mechanism, interface, or device to receive input (such as commands) from the user and to provide output to the user. For example, the I/O components 316 may include (but are not limited to) a graphical user interface, keyboard, mouse, microphone and speakers, squeezable bezel or border of the device 300, physical buttons located on device 300, and so on. The display 314 and/or the I/O components 316 may provide a preview image or depth map of the scene to a user and/or receive a user input for adjusting one or more settings of the device 300 (such as adjusting the intensity of the emissions by transmitter 301, determining or switching the mode of the TOF system, adjusting the field of emission of the transmitter 301, and so on).

The TOF controller 310 may include a signal processor 312, which may be one or more processors to process measurements provided by the receiver 302 and/or control the transmitter 301 (such as switching modes). In some aspects, the signal processor 312 may execute instructions from a memory (such as instructions 308 from the memory 306 or instructions stored in a separate memory coupled to the signal processor 312). In other aspects, the signal processor 312 may include specific hardware for operation. The signal processor 312 may alternatively or additionally include a combination of specific hardware and the ability to execute software instructions.

The transmitter 301 may vary its field of emission for different modes of operation. In some example implementations, the transmitter 301 may include formable means for adjusting the size of the field of emission/transmission. In one example, mirrors attached to actuators (such as microelectromechanical systems (MEMS) actuators) may adjust the focus of the light emissions from the transmitter 301. In another example, an adjustable holographic optical element (HOE) may adjust the focus of the light emissions from the transmitter 301. In a further example, a formable diffractive optical element (DOE) (such as a piezoelectric material to adjust the shape) may be adjusted to focus the diffracted points of light emitted.

In some other example implementations, a plurality of light emitters may be used. The emitters may include a first group of light emitters for emitting light with a first field of transmission. The emitters may further include a second or different group of light emitters for emitting light with a second field of transmission. The first field may be larger than the second field at a common depth from the transmitter 301. In some example implementations, the first group of light emitters may be active for a first mode of the transmitter 301, and the second group of light emitters may be active for a second mode of the transmitter 301.

Figure 4:
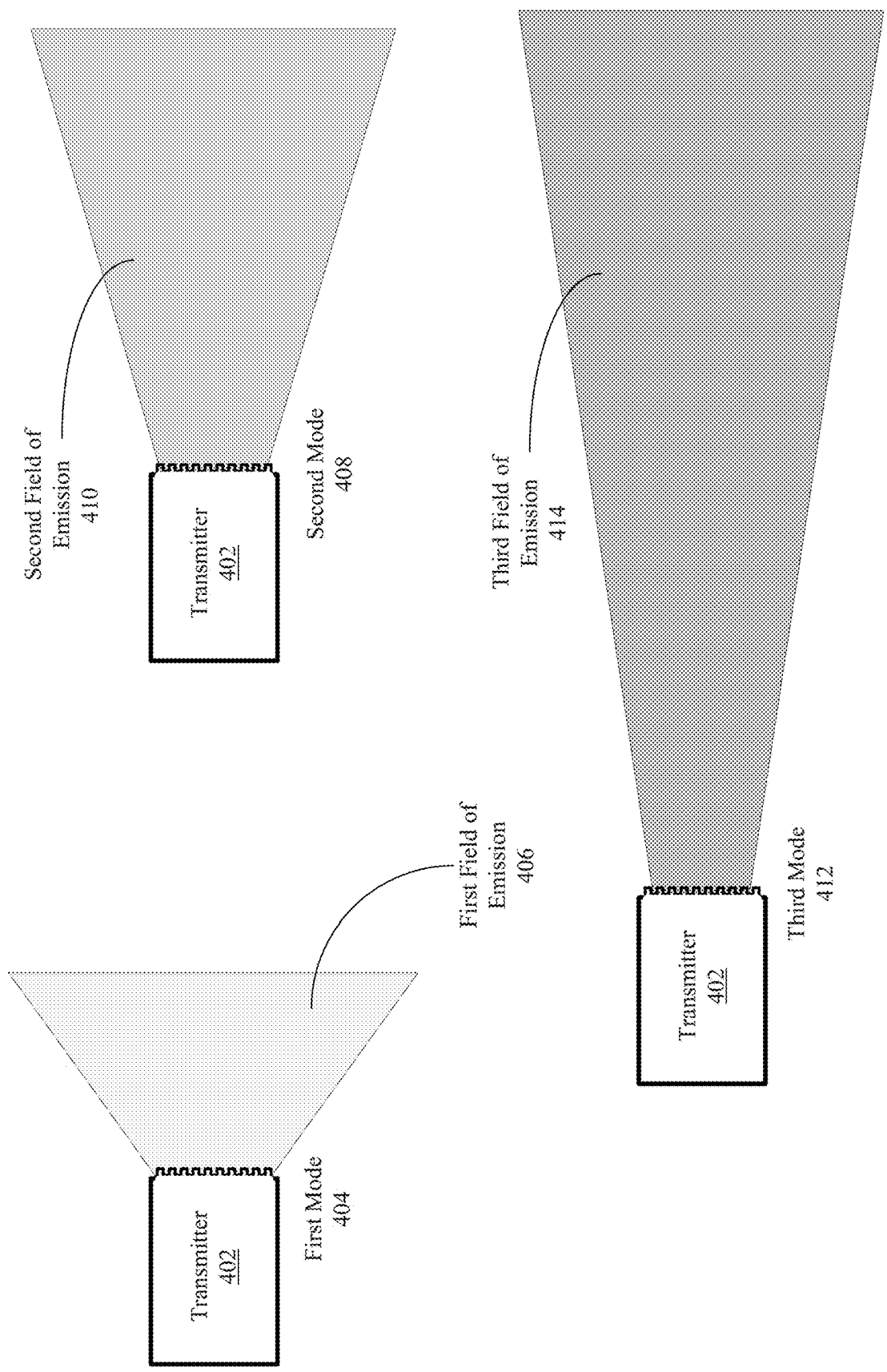
FIG. 4 is a depiction of different fields of emission for a TOF transmitter.

FIG. 4 is a depiction of different fields of emission/transmission for a TOF transmitter 402. The transmitter's first field of transmission 406 may be larger than the second field of transmission 410 at a depth from the TOF transmitter 402. The first field of transmission 406 may also be larger than a third field of transmission 414 for the depth from the TOF transmitter 402. Darker fields of emission/transmission indicate a more focused emission (where the field is smaller at a depth from the transmitter the for less focused emission). In some example implementations, the transmitted light includes the first field of transmission 406 during a first mode 404 in which the TOF transmitter 402 operates, the transmitted light includes the second field of transmission 410 during a second mode 408 in which the TOF transmitter 402 operates, and the transmitted light includes the third field of transmission 414 is during a third mode 412 in which the TOF transmitter 402 operates. While two modes and three modes are shown in the figures and described below, any number of modes may exist. Further, while the examples depict one field of emission/transmission for each mode, a mode may be associated with any number, or range, of fields of emissions. The present disclosure should not be limited to a specific number of modes, matchings, or fields of emission for the TOF transmitter. The present disclosure uses the terms "emission" and "transmission" interchangeably for signals, and the present disclosure should not be limited by use of one of the terms.

Figure 5:
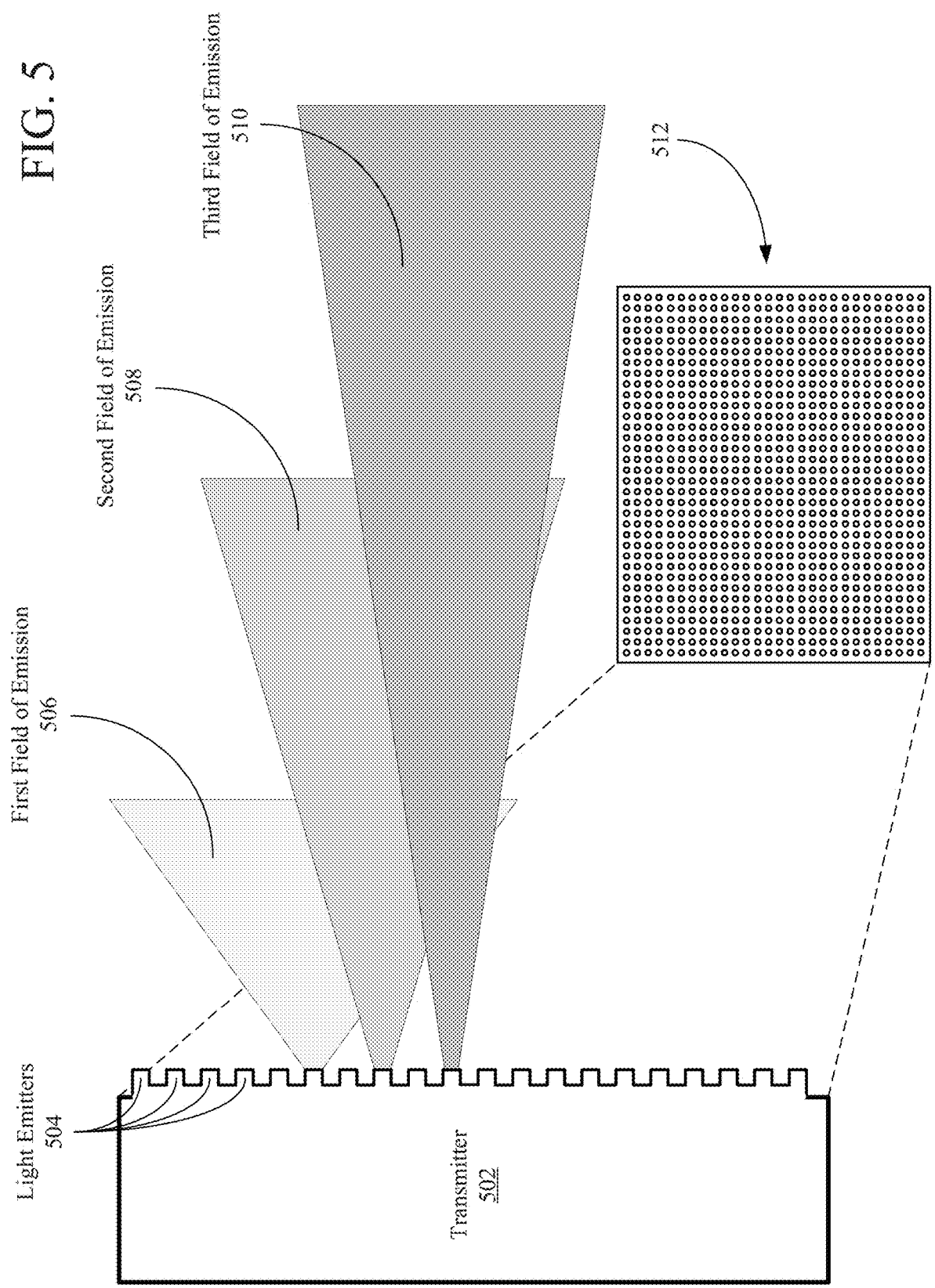
FIG. 5 is a depiction of a TOF transmitter with an array of emitters with different fields of emission.

FIG. 5 is a depiction of a TOF transmitter 502 with an array 512 of light emitters 504 with different fields of emission 506, 508, and 510. In some example implementations, each light emitter 504 is configured to emit light of a fixed field. For example, a first group of the light emitters 504 may be configured to emit light with a first field of emission 506, a second group of the light emitters 504 may be configured to emit light with a second field of emission 508, and a third group of the light emitters 504 may be configured to emit light with a third field of emission 510.

Any size and number or range of emission fields may be used, and the present disclosure should not be limited to the provided examples. While the array 512 is depicted as a two-dimensional array, a one-dimensional array may be used, and any shape of the array and spacing of the emitters for the array may be used.

Emitting or transmitting more focused light a further distance may consume more power than emitting or transmitting less focused light a shorter distance. Further, a device including the TOF system may have power constraints or a limited power supply (such as a battery). The number of emitters emitting more focused light may be less than the number of emitters emitting less focused light. In this manner, the number of light emitters for the third mode may be less than the number of light emitters for the second mode and for the first mode to reduce power consumption and requirements by the TOF system. The different number of emitters for different modes of operation may be used to meet the power constraints for the TOF system.

Figure 6:
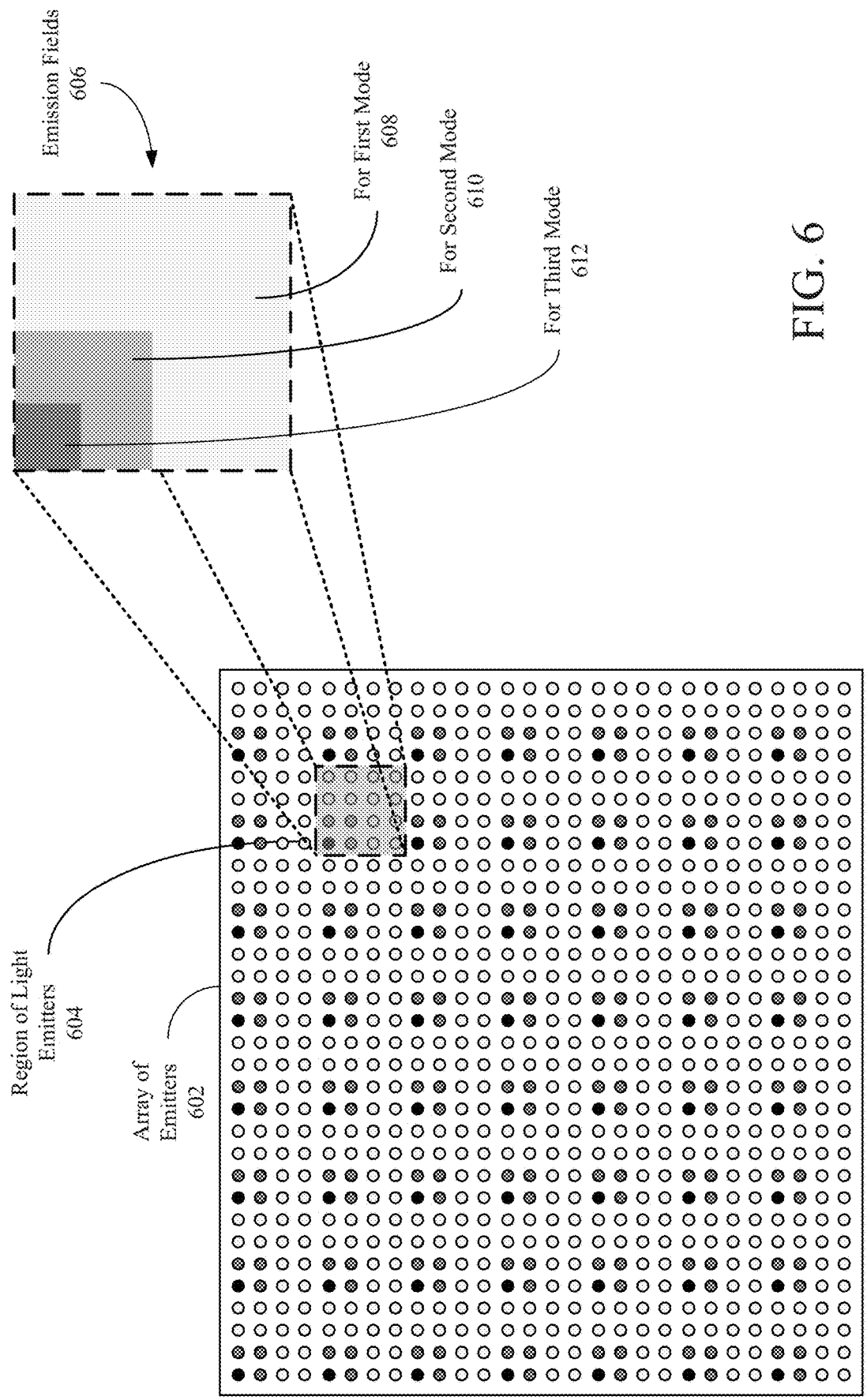
FIG. 6 is a depiction of an array of emitters.

FIG. 6 is a depiction of an example layout of a portion of the array of emitters 602 for a TOF transmitter. The shade of the emissions for emitters in the array of emitters 602 indicates the size of the field of transmission (e.g., a darker shade indicates a smaller field of transmission at a common depth from the transmitter). The array of emitters 602 includes an example distribution of the emitters with different size emission fields. However, any suitable distribution may be used. In the example distribution, the first group of emitters (such as operating in a first mode 608) is greater than the second group of emitters (such as operating in a second mode 610) and is greater than the third group of emitters (such as operating in a third mode 612). Further, the second group of emitters is greater than the third group of emitters. For example, the region of light emitters 604 is a block of light emitters repeated in the array of emitters 602. The region of light emitters 604 corresponds to the emission fields 606 (such as for the three modes).

The emissions with different fields of transmission (such as for different modes) may be time division multiplexed so that different times may correspond to different size fields of emission. In this manner, the emitters for a defined emission field may transmit/emit at a first time when the other emitters are not emitting/transmitting. As a result, interference between emitters with different intensities and fields of the emissions is reduced.

FIG. 7 is a depiction of the coverage of the emission fields 702 for the array of emitters 602 in FIG. 6. The chart of power consumption per light emitter in each mode 704 indicates that the power consumption in the third mode 706 is greater than the power consumption in the second mode 708, which is greater than the power consumption in the third mode 710. The number of emitters emitting per mode may therefore be different. If the number of emitters of a first group of emitters with more focused light emissions is less than the number of emitters of a second group of emitters with less focused light emissions, the overall coverage of the emissions for the first group may be less than the overall coverage of the emissions for the second group. Referring to the chart of the coverage of emission field per mode 712, the coverage of the emission fields 702 in a third mode 714 is less than the coverage of the emission fields 702 in a second mode 716, which is less than the coverage of the emission fields 702 in a first mode 718.

With the third mode having less coverage than the first mode and second mode, less portions of the scene receive and reflect emissions from the TOF transmitter in the third mode than in the first mode or the second mode. Additionally, less portions of the scene receive and reflect emissions from the TOF transmitter in the second mode than in the first mode. As a result, the TOF receiver senses less reflections in the third mode than in the second mode and the first mode, and senses less reflections in the second mode than in the first mode. In this manner, the resolution in sensing the scene may differ between modes. The first mode may provide the greatest resolution, the second mode may provide a resolution greater than the first mode but less than the third mode, and the third mode may provide a resolution less than the first mode and less than the second mode. For example, less pixels of the TOF receiver sensor may sense reflections of the emitted light from the TOF transmitter in the third mode than in the second mode or in the first mode. In this manner, less pixels of the receiver sensor provide measurements to be used in performing ranging/determining depths in a scene. If building a depth map, for example, the resolution with the TOF transmitter in the second mode may be less than the resolution with the TOF transmitter in the first mode. However, a depth map constructed with the TOF transmitter in the second mode may include objects in the scene further from the TOF system than a depth map constructed with the TOF transmitter in the first mode (with the effective range of the TOF system for the second mode higher than for the first mode).

Figure 8:
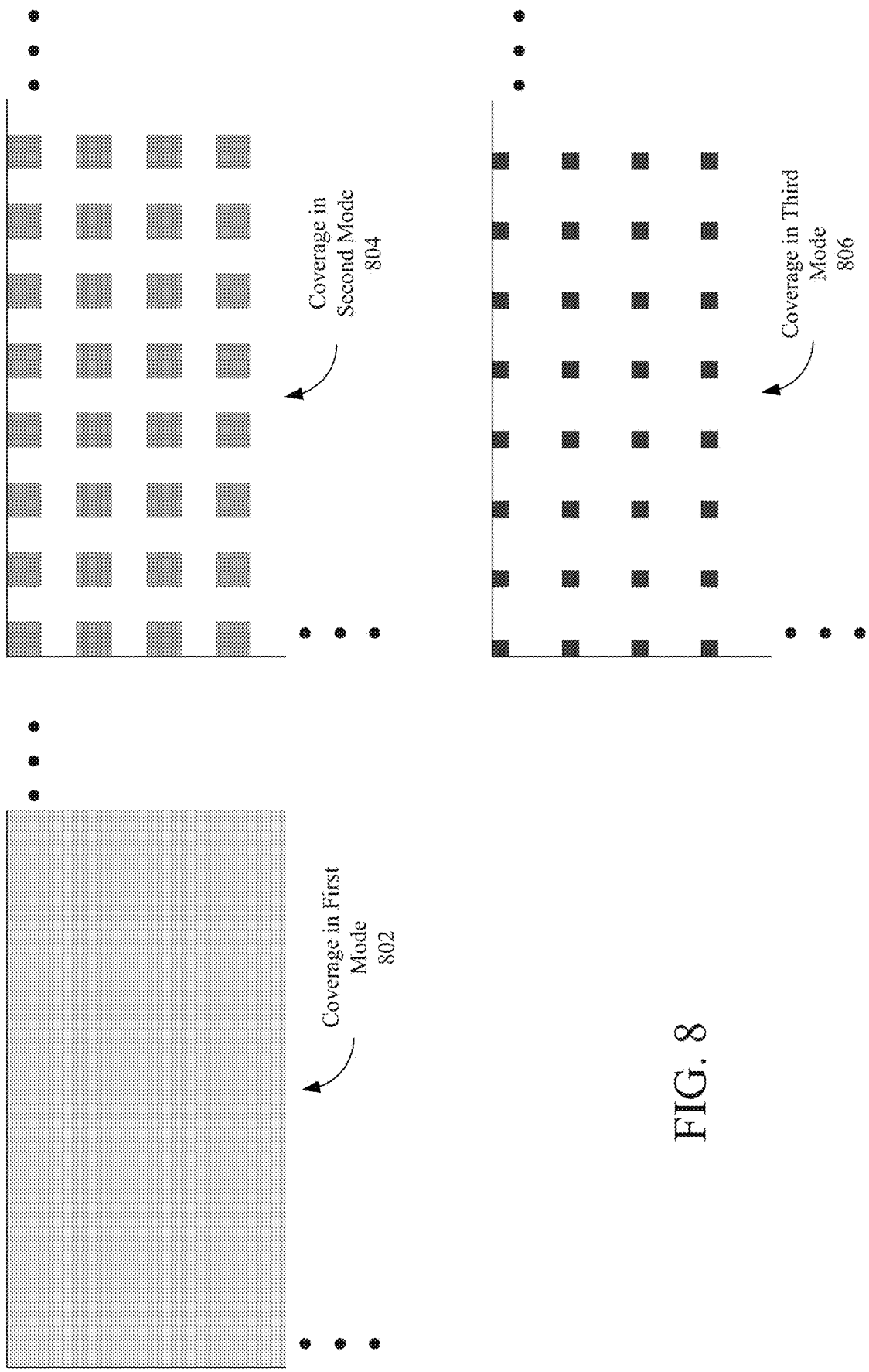
FIG. 8 is a depiction of the coverage of different emission fields for an array of emitters of a TOF system.

FIG. 8 is a depiction of the coverage of different emission fields for an array of emitters of a TOF system. In some example implementations, the different fields may be for different modes of the TOF system. The coverages are an example coverage of the array of emitters 602 in FIG. 6 for the different fields (which may be for different modes). The coverage in the first mode 802 is the greatest between the three modes. In the example, the coverage in the first mode 802 is complete, and all portions of a scene may receive emissions. If the scene is within an effective range of the TOF system for the first mode, approximately all pixels of the receiver sensor may sense reflections of the emissions, and the resolution is the greatest between the modes.

The coverage in the second mode 804 is less than the coverage in the first mode 802. As a result, less portions of a scene may receive emissions than in the first mode, and less pixels of the receiver sensor may sense reflections of the emissions. The effective range of the TOF system in the second mode may be greater than in the first mode. In this manner, reflections from portions of the scene outside the effective range in the first mode may not be sensed, while reflections from the same portions of the scene may be sensed in the second mode.

The coverage in the third mode 806 is less than the coverage in the first mode 802 and in the second mode 804. In this manner, less pixels of the receiver sensor may sense reflections in third mode than in the second mode or in the first mode. However, portions of the scene outside of the effective range in the first mode and the effective range in the second mode may be sensed in the third mode (which may have a higher effective range). Different modes may be used to perform ranging of the scene for different ranges of distances from the TOF system.

Figure 9:
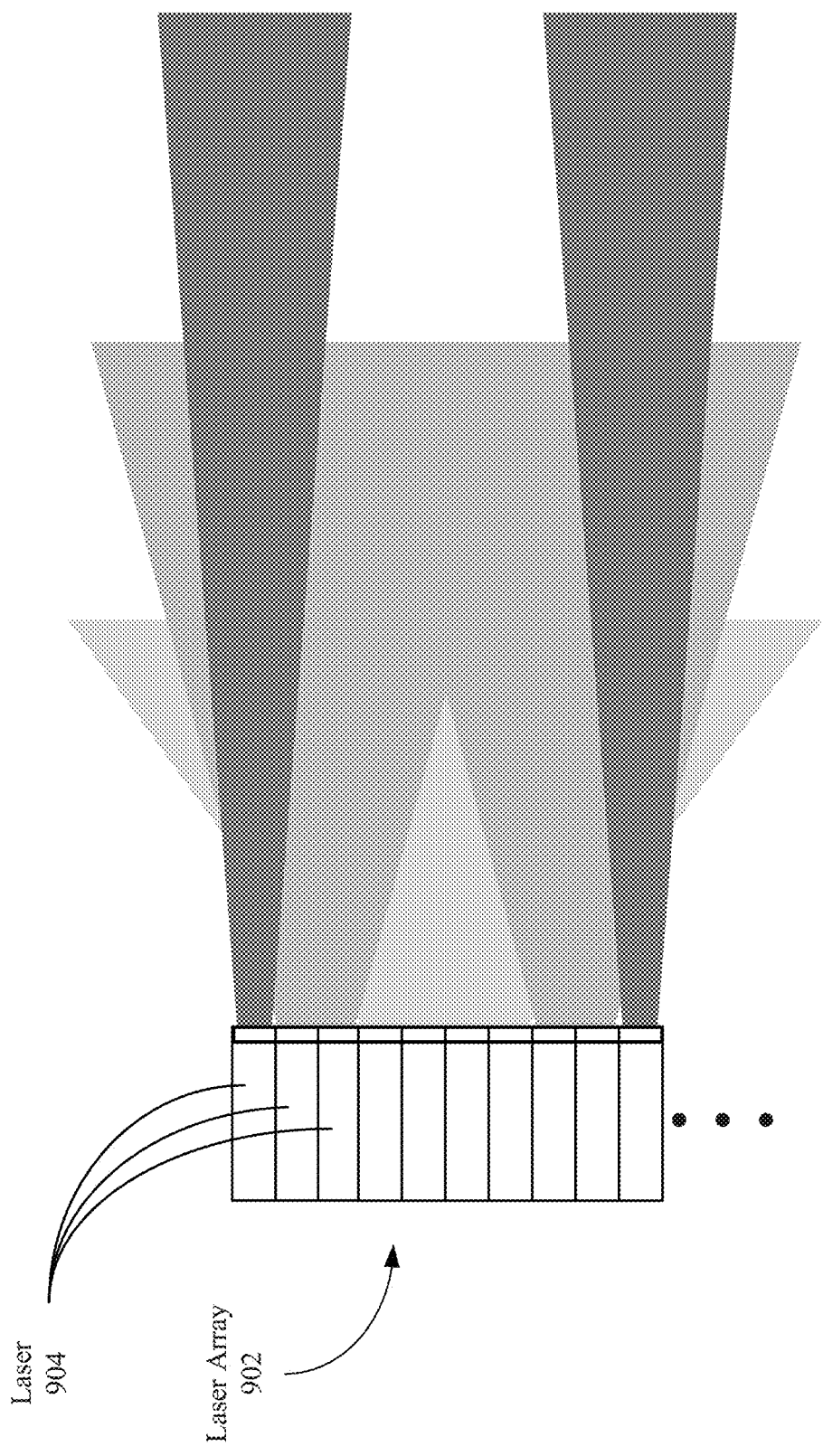
FIG. 9 is a depiction of an example laser array.

In some example implementations, each light emitter may be a laser (such as a vertical-cavity surface-emitting laser (VCSEL) or other suitable type of laser). In this manner, the array of light emitters may be an array of VCSELs (or other suitable laser). FIG. 9 is a depiction of an example laser array 902 where each light emitter of the TOF transmitter is a laser. The laser array 902 includes a plurality of single lasers 904. Each laser 904 may be configured to have an emission field that may differ from other lasers. For example, some lasers may have an emission field of a first size, some other lasers may have an emission field of a second size, and some other lasers may have an emission field of a third size. Each laser may be coupled to a separate power supply (not shown), and the power provided to each laser may differ. Alternatively, lasers for each mode may be coupled to the same power supply, with the power to the lasers differing between modes. In another implementation, the power supply may be the same for the lasers, with switches configured to turn off or on the power to each laser 904 for the different modes or for when to transmit light with the different fields of transmission/emission. The power supply may also be adjustable. For example, the power supplies for the lasers may be adjusted so that the SNR is approximately the same (with a tolerance) across the modes. In this manner, the same SNR threshold may be used to sense the pulses in the reflections (such as the reflected light pulses 216 in FIG. 2).

Figure 10:
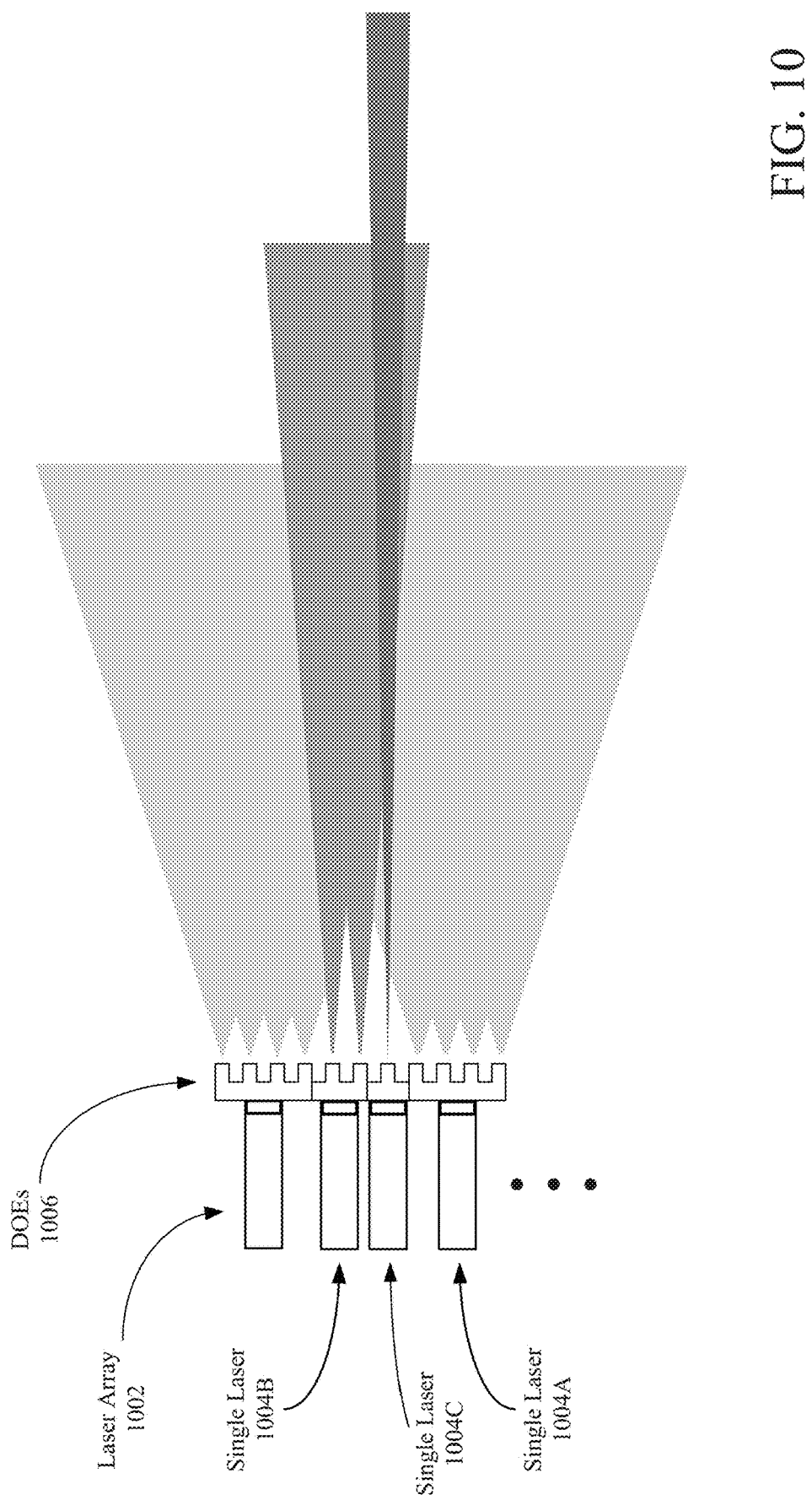
FIG. 10 is a depiction of another example laser array.

In some other example implementations, a laser may be a light source for one or more light emitters of the TOF transmitter. FIG. 10 is a depiction of an example laser array 1002 configured to be the light source for a number of light emitters greater than the number of lasers in the laser array 1002. One or more of the lasers may be coupled to a DOE to diffuse the light from the laser to one or more light emissions for the TOF transmitter. In some example implementations, each laser is coupled to its own DOE. The DOE may be manufactured to diffuse the light from the laser into one or more light emissions with a defined field. In this manner, the fields of emission may differ between the DOEs 1006. For example, a single laser 1004A may be coupled to a DOE to emit light with a first field, a single laser 1004B may be coupled to a DOE to emit light with a second field, and a single laser 1004C may be coupled to a DOE to emit light with a third field. Similar to the described power supplies for the laser array 902 in FIG. 9, each laser in the laser array 1002 may be coupled to a separate power supply, and each laser may be switched on or off, or the power for each laser adjusted, based on the mode of the TOF system or which field size the transmitted light is to have, the SNR measured for the different modes, or other suitable measurements.

Figure 11A:
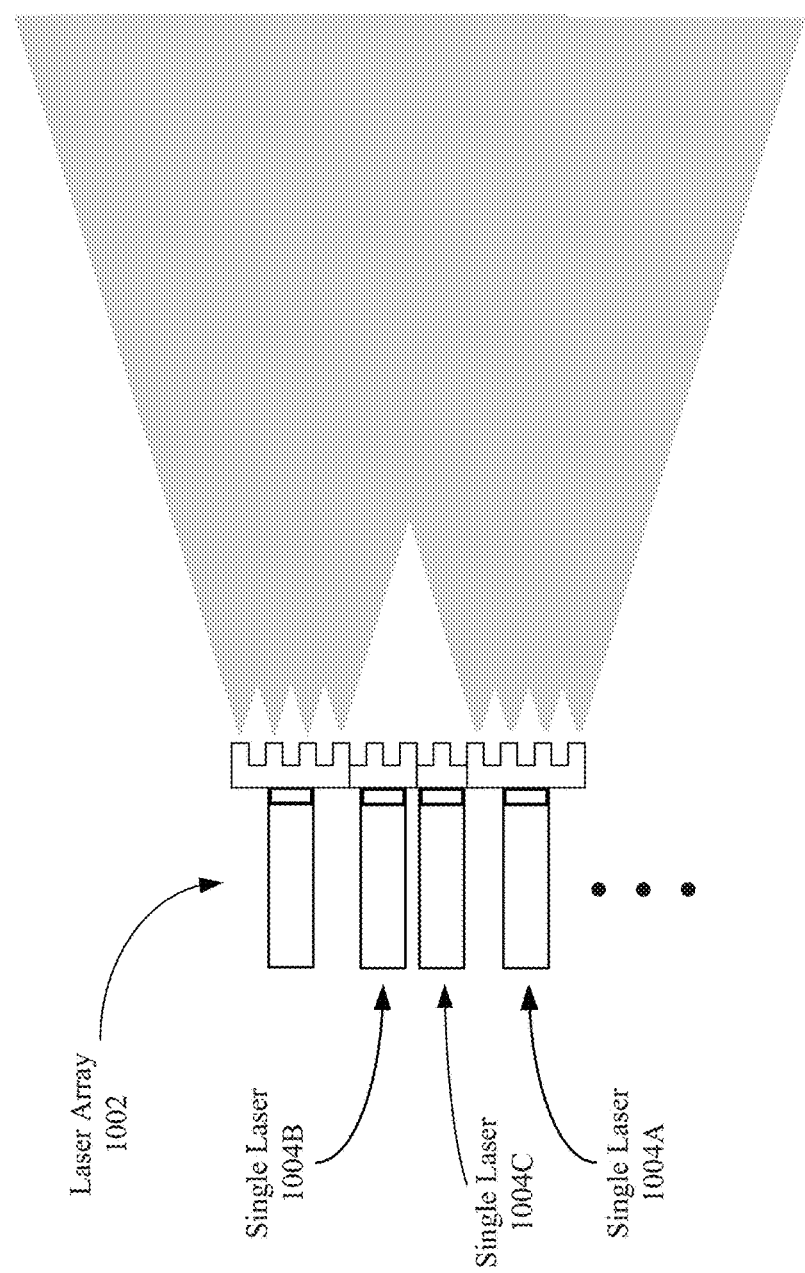
FIG. 11A is a depiction of the first emission field of the example laser array in FIG. 10.
Figure 11B:
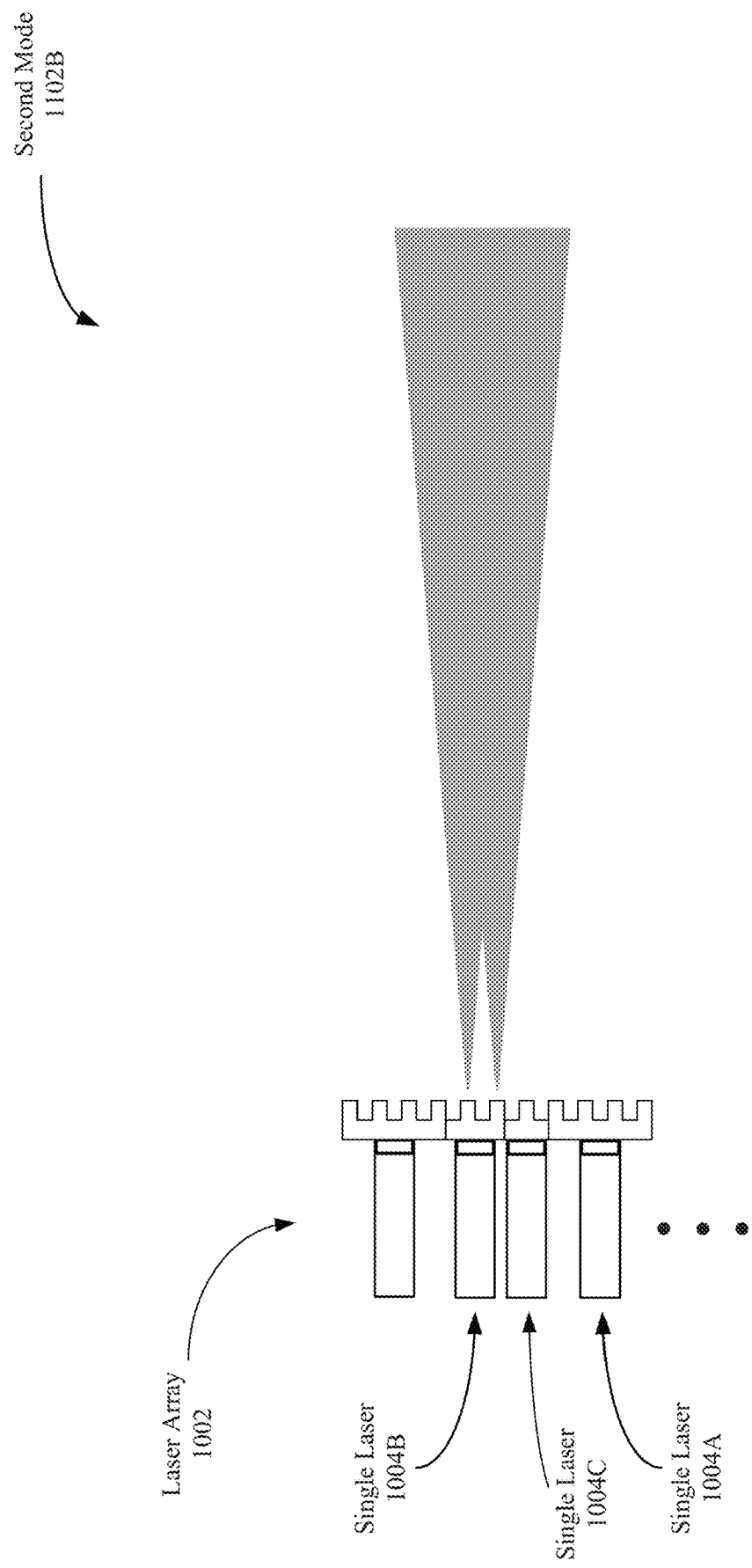
FIG. 11B is a depiction of the second emission field of the example laser array in FIG. 10.
Figure 11C:
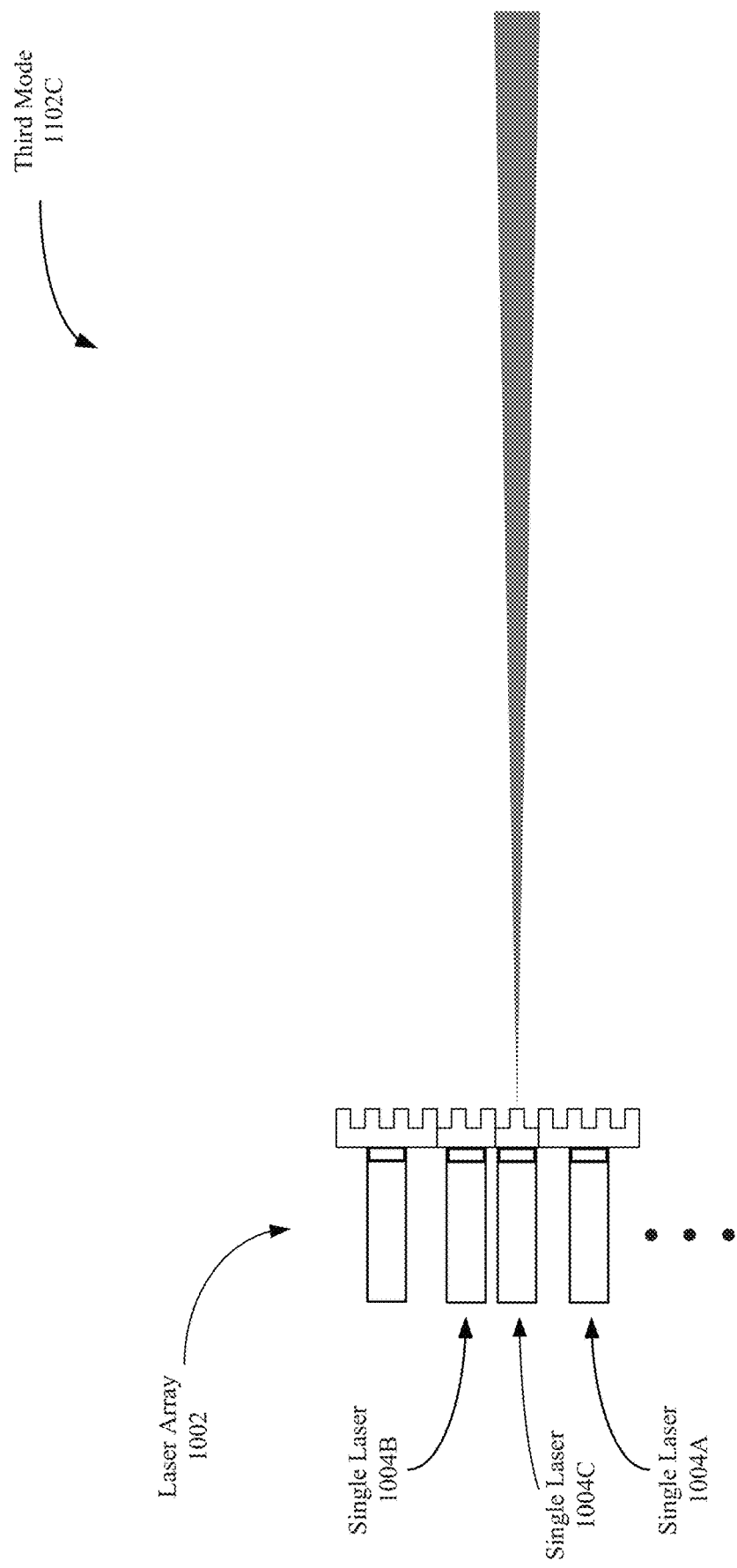
FIG. 11C is a depiction of the third emission field of the example laser array in FIG. 10.

FIG. 11A is a depiction of the first emission field of the example laser array 1002 in FIG. 10 (such as in a first mode 1102A). The lasers for the first mode are switched on (such as single laser 1004A). The lasers for the second mode and the third mode are switched off (such as single laser 1004B and single laser 1004C). FIG. 11B is a depiction of the second emission field of the example laser array 1002 in FIG. 10 (such as in a second mode 1102B). The lasers for the second mode are switched on (such as single laser 1004B). The lasers for the first mode and the third mode are switched off (such as single laser 1004A and single laser 1004C). FIG. 11C is a depiction of the third emission field of the example laser array 1002 in FIG. 10 (such as in a third mode 1102C). The lasers for the third mode are switched on (such as single laser 1004C). The lasers for the first mode and the second mode are switched off (such as single laser 1004A and single laser 1004B).

The TOF transmitter may be placed into different modes of operation, and each mode may be associated with a different field of emission for the TOF transmitter. In this manner, the TOF system may be adjusted to perform ranging for different ranges of distances from the TOF system. The modes may correspond to different applications or use cases. In some example implementations, a TOF controller (such as TOF controller 310 or the signal processor 312 in FIG. 3)

may determine and control when to switch the TOF transmitter (such as transmitter 301 in FIG. 3) between modes. In some other example implementations, other components of a device including the TOF system may determine or control when to switch modes. For example, the processor 304 in FIG. 3 may determine when to switch modes for the transmitter 301. While the following examples of controlling or switching the mode of operation include two modes, any number of modes may be used (including three or more). The present disclosure should not be limited to two (or three) modes.

Figure 12:
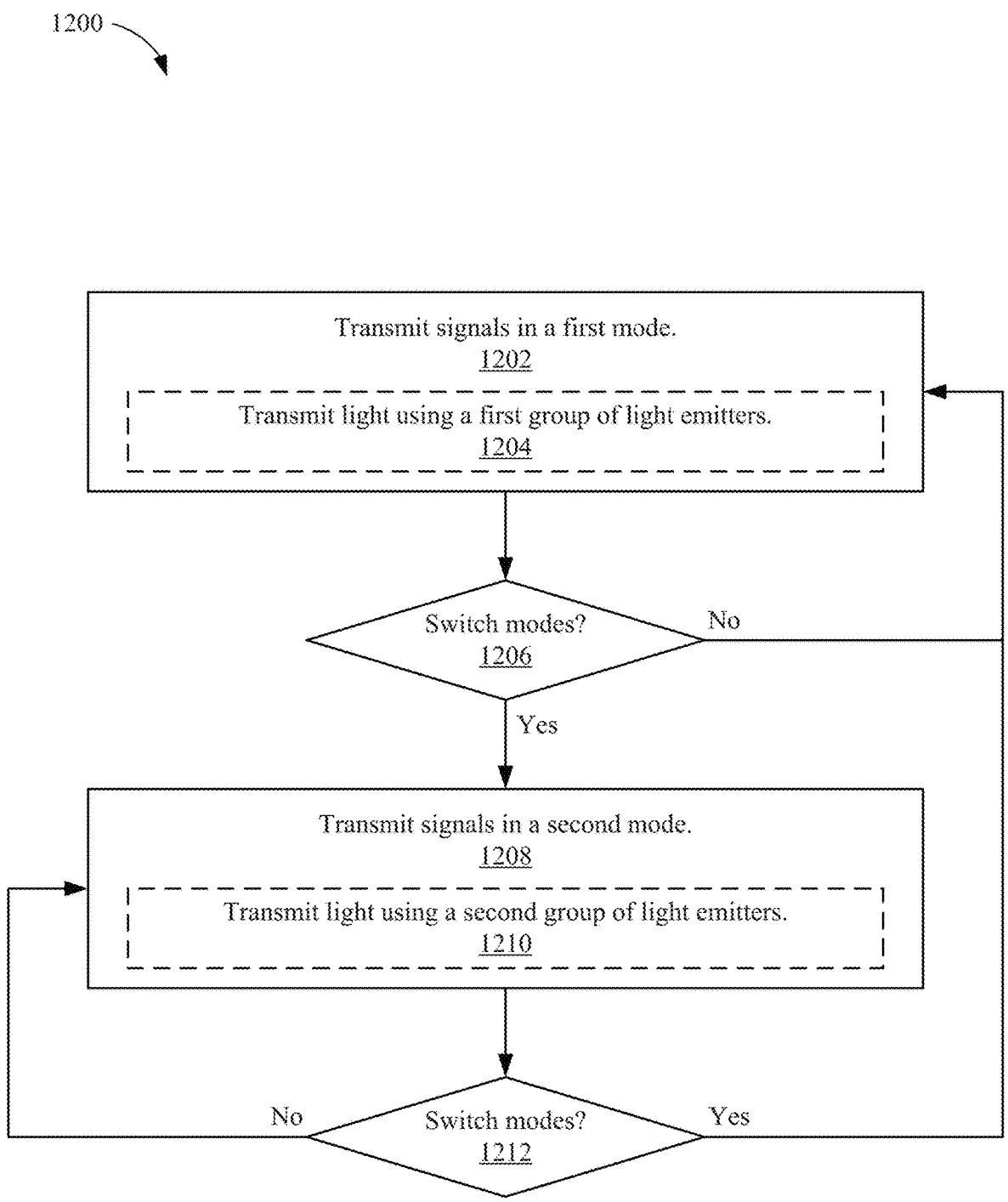
FIG. 12 is a flow chart depicting an example operation of a TOF system transmitting signals in a first mode and in a second mode.

FIG. 12 is a flow chart depicting an example operation 1200 of a TOF system transmitting light in a first mode and in a second mode. Beginning at 1202, the TOF transmitter transmits signals with a first field of emission in a first mode. For example, the TOF transmitter may transmit light using a first group of light emitters (1204), such as from a laser array 902 in FIG. 9 or from a laser array 1002 in FIG. 10.

If the TOF system is to remain in the first mode (1206), the TOF transmitter may continue to transmit signals with the first field of emission (1202). If the TOF system is to switch to the second mode (1206), the TOF transmitter may be placed into the second mode to transmit signals with a second field of emission that is smaller than the first field of emission (1208) at a common depth from the TOF transmitter. For example, the TOF transmitter may transmit light using a second group of light emitters different from the first group of emitters (1210). If the TOF system is to remain in the second mode (1212), the TOF transmitter may continue to transmit signals with the second field of emission (1208). If the TOF system is to switch from the second mode (1212), the TOF transmitter may be placed back into the first mode (1202).

Other processes for switching modes exists, and the present disclosure should not be limited by the example operation 1200. For example, while operation 1200 begins with the TOF transmitter transmitting in a first mode (1202), the TOF transmitter may begin transmitting in any mode. Further, the TOF transmitter may switch to any mode if more than two modes, and is not limited to a defined sequence of modes when switching.

Determining when to vary the emission field for transmitted light or when to switch modes (such as 1206 and 1212 in the example operation 1200) may be based on one or more factors and/or may be configurable or adjustable. For example, a device or TOF system manufacturer may initially configure the TOF system (such as manufacturing DOEs for different lasers and configuring the power supplies for the lasers). A user may also configure or adjust the configuration (such as adjusting the power supplied to the lasers or the timing or conditions for switching).

In some example implementations, determining or switching modes is scheduled based. For example, if the device 300 (FIG. 3) is to perform ranging for all distances (such as in generating a depth map), the device 300 may use a schedule to switch the transmitter 301 between different modes. The schedule may be adjustable, such as for the use case, for compensating for degradation of the TOF system over time, for different ambient light conditions (indoors, outdoors, etc.), for different weather or climate conditions, and so on. Additionally or alternatively, the schedule may be based on the application using the TOF system. For example, a facial and/or iris recognition application may correspond to a schedule with more time for the first mode (with the most coverage by the field of emission of the TOF transmitter) than an object tracking application for objects further from the TOF system.

In some other example implementations, determining or switching modes may be based on a user input. For example, a user may indicate the mode to be used or that the mode is to be switched, such as by manually selecting the mode, increasing the range of current operation for the TOF system, indicating a change in application, and so on. In some further example implementations, switching modes may be based on the application for which the TOF system is used. An object or facial recognition application (during which aspects of an object or a face are to be identified) may correspond to a first mode. For example, unlocking the device 300 via user facial recognition may correspond to a first mode for the TOF system to be used in facial recognition. An object tracking application, where the object is outside the effective range of the first mode, may correspond to one or more modes other than the first mode. A virtual reality application may be associated with two or more modes to generate a depth map of the surroundings, and switching between the two or modes may be determined according to a schedule. Another characteristic may be the SNR. For example, if the SNR in a mode is below a threshold, a different mode for emitting more focused light may be selected.

In some other example implementations, switching modes may be based on information determined from the received reflections from the TOF receiver sensor. In one example, the distance of an object from the TOF system may be used to determine whether the object is to be tracked (using a second mode or higher mode of operation for the TOF system) or the object is to be identified (object recognition using a first mode of operation for the TOF system). In another example, if an object is being tracked, and the object moves between the effective ranges from the TOF system for the different modes, the device 300 may switch modes to track the object.

Figure 13:
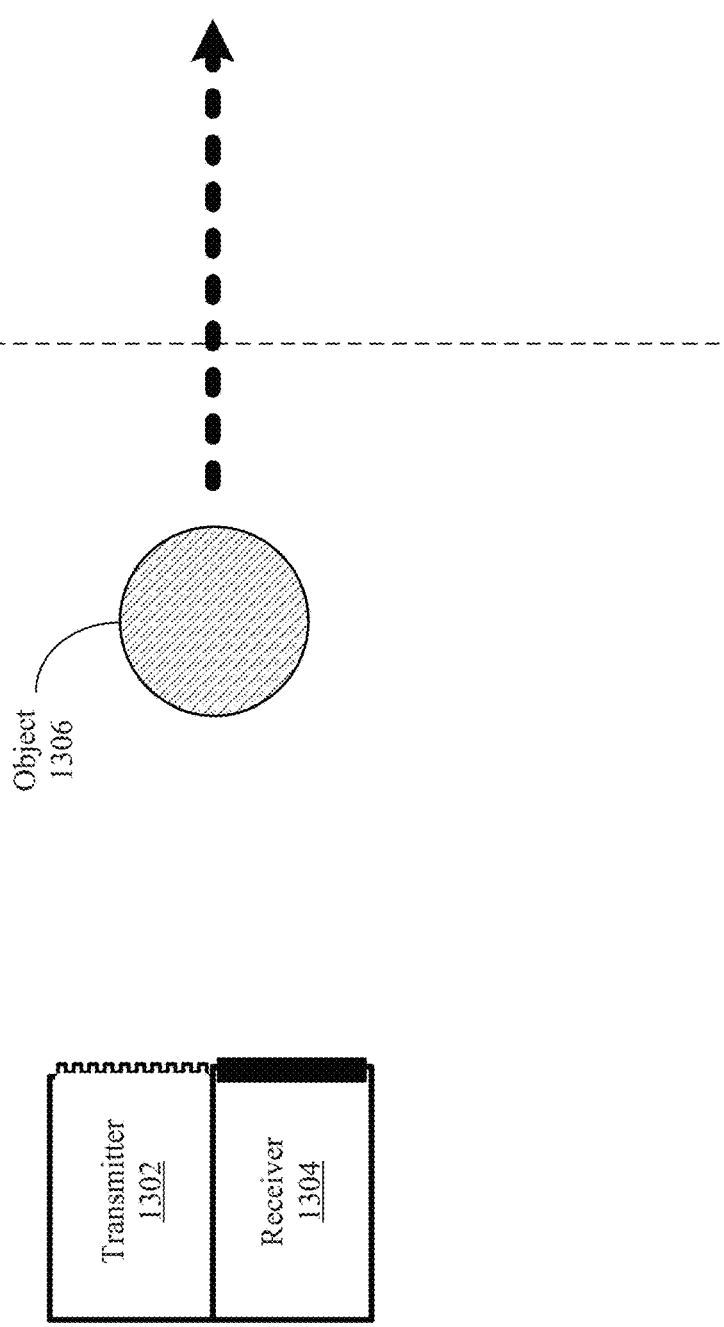
FIG. 13 is a depiction of a TOF system tracking an object moving between different ranges from the TOF system.

FIG. 13 is a depiction of a TOF system (including a transmitter 1302 and a receiver 1304) tracking an object 1306 moving between different ranges from the TOF system. The TOF system may use a first mode to track the object 1306 in the first range 1308. When the object 1306 moves or is about to move from the first range 1308 to the second range 1310, the TOF system may switch from the first mode to the second mode to continue tracking the object 1306. While the ranges are shown as non-overlapping, the ranges may overlap. Further, the ranges may be the same or different in size.

Figure 14:
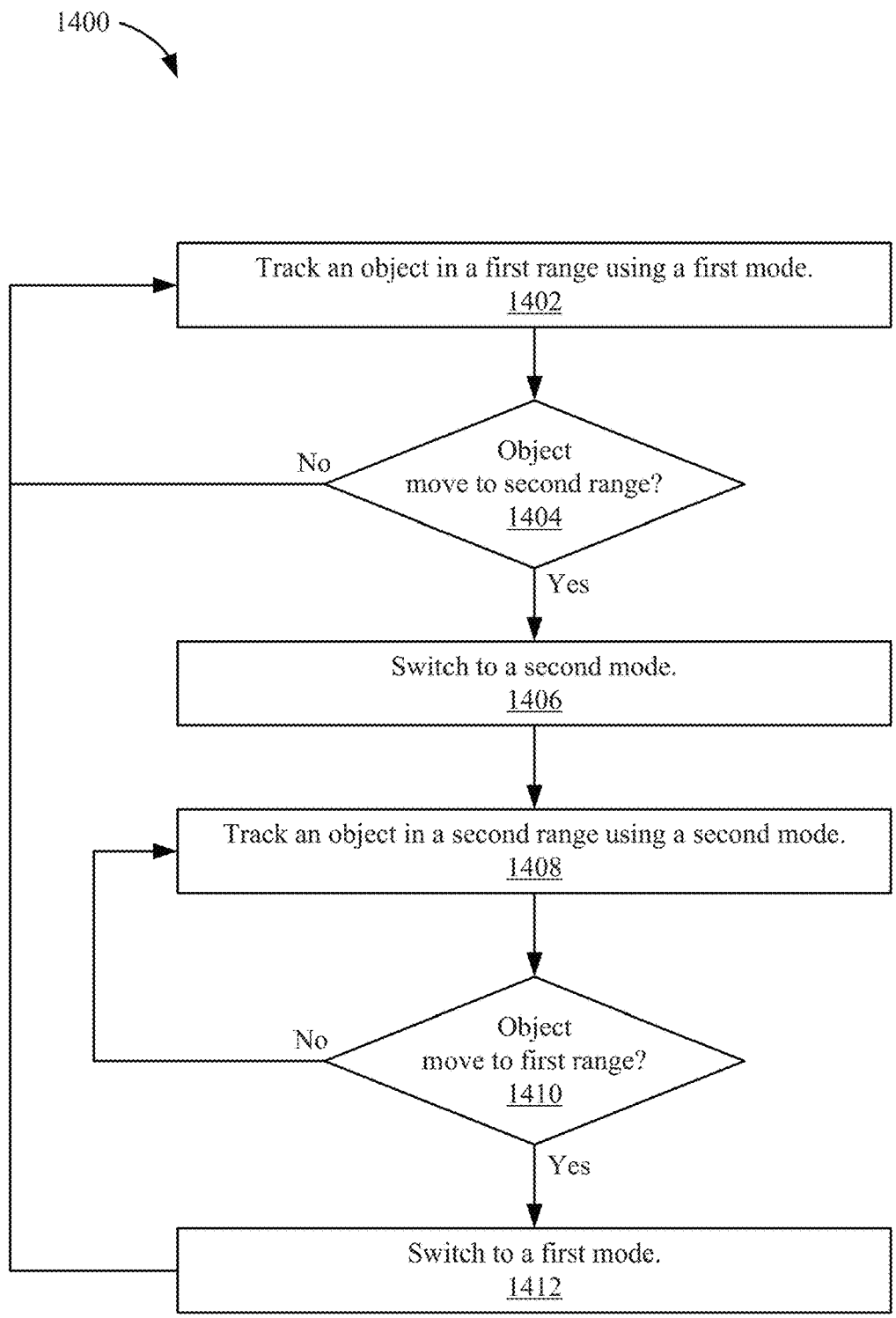
FIG. 14 is a flow chart depicting an example operation of a TOF system switching modes in tracking an object.

FIG. 14 is a flow chart depicting an example operation 1400 of a TOF system switching modes in tracking an object (such as tracking object 1306 in FIG. 13). Beginning at 1402, the device 300 uses the TOF system in the first mode to track an object 1306 in the first range 1308. When the object 1306 is not moving to or about to move to the second range 1310 (1404), the device 300 continues to track the object 1306 using the TOF system in the first mode (1402). When the object 1306 moves to or is about to move to the second range 1310 (1404), the device may switch the TOF system to a second mode (1406) and track the object 1306 in the second range 1310 using the TOF system in the second mode (1408). While the object 1306 remains in the second range 1310 (1410), the device 300 continues to track the object 1306 using the TOF system in the second mode (1408). When the object 1306 moves to or is about to move to the first range 1308 (1410), the device 300 switches the TOF system to the first mode (1412) and tracks the object 1306 in the first range 1308 (1402). While two ranges and modes of operation for the TOF system are illustrated, any number of ranges and modes of operation may be used. The present disclosure should not be limited to a specific number of ranges or modes.

Determining or switching modes may be based on non-TOF ranging measurements in some other example implementations. The device 300 may determine or switch modes based on one or more measurements from the sensor 320. In one example, if the device 300 receives a motion measurement (such as from an accelerometer, inertial sensor, or other suitable motion sensor) greater than a threshold indicating the device 300 is moving, the device 300 may switch the mode of the TOF system to increase the effective range (such as for obstacle avoidance). Further, the mode and thus the effective range may be selected based on the speed (with higher effective ranges used during faster speeds). In another example, if the transmitter 301 is directed toward the ground (such as measured by a gyroscope or other suitable orientation sensor), the device 300 may switch the mode for a shorter effective range since the distance of the floor is shorter than the horizon.

Additionally or alternatively, the device 300 may determine or switch modes based on measurements or captures from the camera 303. In one example, if a face is identified in the capture stream and is a threshold size and stable in the field of view of the camera, the device 300 may determine to switch the transmitter 301 to a first mode in case facial recognition is to be performed. In another example, if the scene in the capture stream is sufficiently changing (such as a global motion), the device 300 may determine to switch the transmitter 301 to a mode with a higher effective range or to multiple modes in case object detection and avoidance is to be performed.

Figure 15:
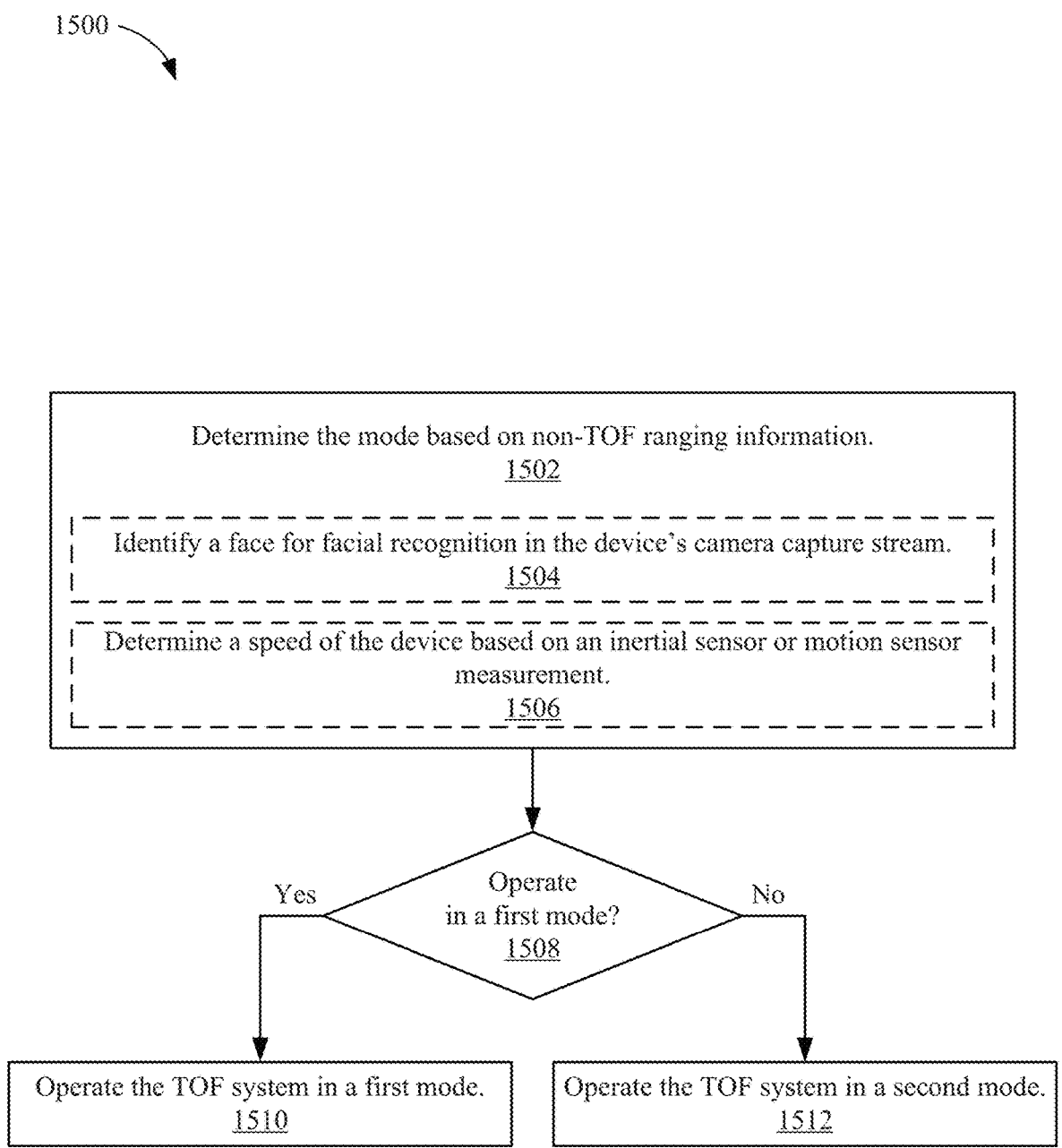
FIG. 15 is a flow chart depicting an example operation of determining a mode of a TOF system based on non-TOF ranging information.

FIG. 15 is a flow chart depicting an example operation 1500 of determining a mode for operating a TOF system based on non-TOF ranging measurements. Beginning at 1502, the device 300 may determine the mode of the TOF system based on one or more non-TOF ranging measurements or information (1502). In one example, the device 300 may identify a face or iris for recognition in the capture stream of the camera 303 (1504). In an additional or alternative example, the device 300 may determine its speed based on an inertial sensor or motion sensor measurement (1506). The information from the camera 303 and or the sensor 320 may then be used to determine the mode.

If the device 300 determines that the TOF system is to operate in the first mode (1508), the device operates the TOF system in the first mode (1510). For example, if a face for facial recognition is identified in the camera stream, the device 300 may operate the TOF system in the first mode for facial recognition. If the device 300 determines that the TOF system is not to operate in the first mode (1508), the device operates the TOF system in the second mode (1512). For example, if a motion sensor indicates that the device 300 is moving faster than a threshold, the device 300 may operate the TOF system in the second mode for obstacle detection and avoidance. While two modes are described, any number of modes may be used. Further, while some example non-TOF measurements are described, any suitable non-TOF measurement may be used, and the present disclosure should not be limited to the provided examples.

The TOF system and method of operation may be configured by any suitable means and for any suitable uses. Further, techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software (such as a device altering the spatial distribution for an included structured light system), the techniques may be realized at least in part by a non-transitory processor-readable storage medium (such as the memory 306 in the example device 300 of FIG. 3) comprising instructions 308 that, when executed by the processor 304 (or the TOF controller 310 or the signal processor 312), cause the device 300 or the TOF system to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 304 or the signal processor 312 in the example device 300 of FIG. 3. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the examples for the TOF system are described regarding light emissions, signals at other frequencies may be used, such as microwaves, radio frequency signals, sound signals, and so on. Additionally, the functions, steps or actions of the method claims in accordance with aspects described herein need not be performed in any particular order unless expressly stated otherwise. For example, the steps of the described example operations, if performed by the device 300, the TOF controller 310, the processor 304, and/or the signal processor 312, may be performed in any order. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A time-of-flight (TOF) system, comprising:
a transmitter including a plurality of light emitters for transmitting light, the plurality of light emitters including a first group of light emitters for transmitting light with a first field of transmission and a first amount of power and a second group of light emitters for transmitting light with a second field of transmission and a second amount of power, the first amount of power being less than the second amount of power, wherein the first field of transmission at a depth from the transmitter is larger than the second field of transmission at the depth from the transmitter; and
a sensor configured to receive reflections of the transmitted light, wherein pixels of the sensor are arranged to receive, by a first number of pixels, reflections of light emitted by the first group of light emitters at the depth, wherein the pixels are arranged to receive, by a second number of pixels, reflections of light emitted by the second group of light emitters at the depth, and wherein the second number is less than the first number.

2. The TOF system of claim 1, wherein each light emitter of the first group of light emitters has a field of transmission at the depth from the transmitter that is larger than a field of transmission at the depth from the transmitter for each light emitter of the second group of light emitters.

3. The TOF system of claim 2, wherein the first group of light emitters is distributed regularly on a surface of the transmitter, and the second group of light emitters is distributed regularly among the first group of light emitters.

4. The TOF system of claim 2, wherein a number of light emitters in the first group is greater than a number of light emitters in the second group.

5. The TOF system of claim 2, wherein the plurality of light emitters includes one or more vertical-cavity surface emitting lasers (VCSELs).

6. The TOF system of claim 5, wherein the plurality of light emitters further includes one or more diffractive optical elements (DOEs), and wherein a VCSEL of the one or more VCELs is coupled to a DOE of the one or more DOEs to diffract a light from the VCSEL into multiple light transmissions.

7. The TOF system of claim 1, wherein the plurality of light emitters are coupled to one or more power sources configured to provide an overall first current when transmitting light with the first field of transmission and to provide an overall second current when transmitting light with the second field of transmission, and wherein a current per light emission for the overall first current is less than a current per light emission for the overall second current.

8. The TOF system of claim 1, further comprising:
one or more processors; and
a memory coupled to the one or more processors and including instructions that, when executed by the one or more processors, cause the TOF system to perform operations comprising:
determining one or more depths of a scene from received reflections of transmitted light from the first group of light emitters transmitting in a first mode; and
determining one or more depths of the scene from received reflections of transmitted light from the second group of light emitters transmitting in a second mode.

9. The TOF system of claim 8, wherein the first mode and the second mode are time-division multiplexed.

10. The TOF system of claim 8, wherein execution of the instructions causes the TOF system to perform operations further comprising switching between the first mode and the second mode based on at least of:
a user input;
a schedule;
information determined from non-TOF ranging measurements;
information determined from the received reflections; and
an application for which the TOF system is used during operation.

11. The TOF system of claim 10, wherein the information determined from the received reflections includes a determined distance of an object being tracked, and execution of the instructions causes the TOF system to perform operations further comprising determining when to switch between the first mode and the second mode based on the determined distance of the object.

12. The TOF system of claim 10, wherein the first mode is for identification or feature recognition of an object, and the second mode is for distance ranging of the object.

13. The TOF system of claim 1, wherein the plurality of light emitters further includes a third group of light emitters for transmitting light with a third field of transmission, wherein the third field of transmission at the depth from the transmitter is smaller than the second field of transmission at the depth from the transmitter.

14. A method for performing time-of-flight (TOF) ranging, comprising:
transmitting, by a transmitter including a plurality of light emitters, light, wherein a first group of light emitters of the plurality of light emitters are configured to transmit light with a first field of transmission and a first amount of power and a second group of light emitters of the plurality of light emitters are configured to transmit light with a second field of transmission and a second amount of power, the first amount of power being less than the second amount of power, wherein the first field of transmission at a depth from the transmitter is larger than the second field of transmission at the depth from the transmitter; and
receiving, by a sensor, reflections of the transmitted light, wherein a first number of pixels of the sensor receiving reflections of light emitted by the first group of light emitters is greater than a second number of pixels of the sensor receiving reflections of light emitted by the second group of light emitters.

15. The method of claim 14, wherein transmitting by the first group of light emitters includes transmitting, by a light emitter of the first group of light emitters, light with a field of transmission, the field of transmission at the depth from the transmitter greater than a field of transmission at the depth from the transmitter for each light emitter of the second group of light emitters.

16. The method of claim 15, wherein the transmitted light from the first group of light emitters is distributed regularly in the first field of transmission, and the transmitted light from the second group of light emitters is distributed regularly among locations of the transmitted light from the first group of light emitters.

17. The method of claim 15, wherein transmitting by the first group of light emitters includes a first number of light transmissions and transmitting by the second group of light emitters includes a second number of light transmissions, the first number greater than the second number.

18. The method of claim 14, further comprising:
determining one or more depths of a scene from received reflections of transmitted light from the first group of light emitters transmitting in a first mode; and
determining one or more depths of the scene from received reflections of transmitted light from the second group of light emitters transmitting in a second mode.

19. The method of claim 18, wherein the first mode and the second mode are time-division multiplexed.

20. The method of claim 18, further comprising switching between the first mode and the second mode based on at least one of:
a user input;
a schedule;
information determined from non-TOF ranging measurements;
information determined from the received reflections; and
an application for using TOF ranging.

21. The method of claim 20, wherein the information determined from the received reflections includes a determined distance of an object being tracked, and determining when to switch between the first mode and the second mode is based on the determined distance of the object.

22. The method of claim 20, wherein the first mode is for identification or feature recognition of an object, and the second mode is for distance ranging of the object.

23. The method of claim 16, wherein a third group of light emitters of the plurality of light emitters are configured to transmit light with a third field of transmission, wherein the third field of transmission at the depth from the transmitter is smaller than the second field of transmission at the depth from the transmitter.

24. A non-transitory computer-readable medium storing one or more programs containing instructions that, when executed by one or more processors of a device, cause the device to perform operations comprising:
transmitting, using a transmitter including a plurality of light emitters, light, wherein a first group of light emitters of the plurality of light emitters are configured to transmit light with a first field of transmission and a first amount of power and a second group of light emitters of the plurality of light emitters are configured to transmit light with a second field of transmission and a second amount of power, the first amount of power being less than the second amount of power, wherein the first field of transmission at a depth from the transmitter is larger than the second field of transmission at the depth from the transmitter; and
receiving, using a sensor, reflections of the transmitted light, wherein a first number of pixels of the sensor receiving reflections of light emitted by the first group of light emitters is greater than a second number of pixels of the sensor receiving reflections of light emitted by the second group of light emitters.

25. The non-transitory computer-readable medium of claim 24, wherein transmitting by the first group of light emitters includes transmitting, by a light emitter of the first group of light emitters, light with a field of transmission, the field of transmission at the depth from the transmitter greater than a field of transmission at the depth from the transmitter for each light emitter of the second group of light emitters.

26. The non-transitory computer-readable medium of claim 25, wherein the transmitted light from the first group of light emitters is distributed regularly in the first field of transmission, and the transmitted light from the second group of light emitters is distributed regularly among locations of the transmitted light from the first group of light emitters.

27. The non-transitory computer-readable medium of claim 24, wherein execution of the instructions causes the device to perform operations further comprising:
determining one or more depths of a scene from received reflections of transmitted light from the first group of light emitters transmitting in a first mode; and
determining one or more depths of the scene from received reflections of transmitted light from the second group of light emitters transmitting in a second mode.

28. The non-transitory computer-readable medium of claim 27, wherein execution of the instructions causes the device to perform operations further comprising switching between the first mode and the second mode based on at least one of:
a user input;
a schedule;
information determined from non-TOF ranging measurements;
information determined from the received reflections; and
an application for using TOF ranging.

29. A device, comprising:
means for transmitting light with a first field of transmission and a first amount of power;
means for transmitting light with a second field of transmission and a second amount of power, wherein the first field of transmission at a depth is larger than the second field of transmission and the first amount of power is less than the second amount of power; and
means for receiving reflections of the transmitted light, wherein the means for receiving is arranged to receive, by a first number of pixels, reflections of light transmitted by the means for transmitting light with the first field of transmission at the depth, wherein the means for receiving is arranged to receive, by a second number of pixels, reflections of light transmitted by the means for transmitting light with the second field of transmission at the depth, and wherein the second number is less than the first number.

30. The device of claim 29, further comprising:
means for determining one or more depths of a scene from received reflections of transmitted light with the first field of transmission in a first mode;
means for determining one or more depths of the scene from received reflections of transmitted light with the second field of transmission in a second mode; and
means for switching between the first mode and the second mode based on at least one of:
a user input;
a schedule;
information determined from non-TOF ranging measurements;
information determined from the received reflections; and
an application for using TOF ranging.

* * * * *